US011060870B2

(12) United States Patent
Bhan et al.

(10) Patent No.: US 11,060,870 B2
(45) Date of Patent: Jul. 13, 2021

(54) PROCESS AND MACHINE TO PREDICT AND PREEMPT AN AERODYNAMIC DISTURBANCE

(71) Applicant: The Boeing Company, Chicago, IL (US)

(72) Inventors: Sankalp K. Bhan, St. Louis, MO (US); Daniel Garrett Donahue, Maryland Heights, MO (US); Ryan Grey Endres, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 16/550,246

(22) Filed: Aug. 25, 2019

(65) Prior Publication Data
US 2021/0055111 A1 Feb. 25, 2021

(51) Int. Cl.
| | | |
|---|---|---|
| *G01C 21/16* | (2006.01) | |
| *B64G 1/24* | (2006.01) | |
| *G01C 21/20* | (2006.01) | |
| *B64G 3/00* | (2006.01) | |
| *G01C 21/00* | (2006.01) | |

(52) U.S. Cl.
CPC ............... *G01C 21/16* (2013.01); *B64G 1/24* (2013.01); *G01C 21/20* (2013.01); *B64G 3/00* (2013.01); *B64G 2700/24* (2013.01)

(58) Field of Classification Search
CPC ..................................................... B64D 43/02
See application file for complete search history.

(56) References Cited

U.S. PATENT DOCUMENTS

| | | | | |
|---|---|---|---|---|
| 6,416,017 B1* | 7/2002 | Becker | .................... | B64C 13/16 244/194 |
| 6,694,230 B2* | 2/2004 | Kubica | ................... | B64C 13/18 701/11 |
| 6,928,341 B2 | 8/2005 | Wise | | |

(Continued)

OTHER PUBLICATIONS

Gadient, "Adaptive Control With Aerospace Applications, Dissertation," University of Southern California, May 2013, 153 pages.

(Continued)

*Primary Examiner* — Bernarr E Gregory
(74) *Attorney, Agent, or Firm* — Yee & Associates, P.C.

(57) ABSTRACT

A process and machine configured to predict and preempt an aerodynamic disturbance. The machine may include a BDE (Bhan-Donahue-Endres) adaptor configured to that comprises a specially programmed processor that has an adaptive learning control and rules to: modify a control augmentation system on an aerospace vehicle, to preclude an undesired state of the aerospace vehicle unaccounted for by control laws in current control augmentation systems; form a prediction for an airspeed of the aerospace vehicle that replaces an airspeed input from a sensor of the aerospace vehicle, in a phase of operation prone to instrumentation error, into the control augmentation system; generate an estimate, based upon the prediction, of an anticipated disturbance to a desired state of the aerospace vehicle; and generate, based upon the estimate, a command to a control element of the aerospace vehicle that preempts the undesired state of the aerospace vehicle.

20 Claims, 10 Drawing Sheets

(56) References Cited

U.S. PATENT DOCUMENTS

| | | | |
|---|---|---|---|
| 7,098,810 B2* | 8/2006 | Bateman | G05D 1/0061 |
| | | | 244/197 |
| 8,195,346 B1* | 6/2012 | Duerksen | B64C 13/16 |
| | | | 701/15 |
| 9,938,018 B2* | 4/2018 | Welsh | B64D 43/02 |
| 10,043,402 B1* | 8/2018 | Alvarez | B64D 43/02 |
| 10,228,692 B2* | 3/2019 | Prosser | B64D 43/00 |
| 10,723,480 B1* | 7/2020 | McCusker | B64D 43/00 |
| 2011/0184592 A1* | 7/2011 | Elias | G01C 23/00 |
| | | | 701/7 |
| 2019/0367178 A1* | 12/2019 | Matayoshi | B64D 43/02 |

OTHER PUBLICATIONS

Lavretsky, "Robust and Adaptive Control with Aerospace Applications," Springer Science & Business Media, Nov. 13, 2012, 454 pages, Summary Only.

Brogan, "Modern Control Theory," 3rd Edition, Prentice-Hall Inc., New Jersey, 1991, 672 pages.

* cited by examiner

PROCESS AND MACHINE TO PREDICT AND PREEMPT AN AERODYNAMIC DISTURBANCE

BACKGROUND INFORMATION

1. Field

The present disclosure relates generally to an aerospace vehicle and, in particular, to controlling a state of the aerospace vehicle. More particularly, the present disclosure relates to a method and apparatus for commanding a control element on an aerospace vehicle to control the state of the aerospace vehicle.

2. Background

As referenced herein, an aerodynamic disturbance is an undesired disruption to a state of an aerospace vehicle caused by the aerospace vehicle's external or internal aerodynamics. In other words, an aerodynamic disturbance includes exogenous influences that cause a state of an aerospace vehicle to deviate from a commanded intended state for the aerospace vehicle. An aerodynamic disturbance may be time dependent and transient. As used herein, the term exogenous indicates an influence outside of one generated by a control input unit of the aerospace vehicle, whether the control input unit is activated manually or through automation. The state of the aerospace vehicle may be defined relative to any of several conditions. The conditions may include, without limitation, a trajectory of the aerospace vehicle, an energy state of the aerospace vehicle, a stability state of the aerospace vehicle, a responsiveness of the aerospace vehicle, a configuration of the aerospace vehicle, a position of the aerospace vehicle in space, an orientation of the aerospace vehicle relative to a set of axes, a condition of a system on the aerospace vehicle, or a combination of any of the above.

SUMMARY

In one illustrative example, a process is shown for correcting for errors in signals, from sensors on an aerospace vehicle, being input to a control augmentation system for the aerospace vehicle, via: deriving a predicted airspeed for the aerospace vehicle in an adaptor in a processor comprising code specially programmed for replacing the signals being input to the control augmentation system with the predicted airspeed. The process includes: estimating, using the adaptor and the predicted airspeed, an onset and characteristics of an undesired state of the aerospace vehicle; deriving, using the adaptor and an estimation of the onset and the characteristics of the undesired state, a command prior to the onset of the undesired state and precluding the onset of the undesired state; and issuing the command to a control element of the aerospace vehicle to preempt the undesired state.

The process may be applied wherein the aerospace vehicle is an aircraft configured with a control augmentation system. In the process, the predicted airspeed may be derived by a length of time preceding a time predicted, for an occurrence of the predicted airspeed, that is greater than a time period required for generating and executing the command. Further, the length of time may be at least 0.5 seconds. The undesired state recited in the process may include transonic pitch disturbances to the aerospace vehicle.

The process provides an innovative technical solution of expanding an operating envelope allowed by the control augmentation system for the aerospace vehicle. The process expands a flight performance envelope for the aerospace vehicle via relaxing constraints on a control law for the aerospace vehicle. The aerospace vehicle may be an aircraft configured for transonic flight.

In yet another illustrative example, a process for controlling flight control surfaces and expanding an operating envelope for an aerospace vehicle, the process includes: inserting a BDE (Bhan-Donahue-Endres) adaptor onto a control augmentation system for the aerospace vehicle. The BDE adaptor includes a processor that includes code specially programmed for: replacing a signal from a sensor on the aerospace vehicle being input to the control augmentation system with a predicted airspeed; estimating, using the predicted airspeed, an onset and characteristics of an undesired state of the aerospace vehicle; deriving, using an estimation of the onset and the characteristics of the undesired state, a command prior to the onset of the undesired state for preempting the onset of the undesired state; and issuing the command to a control element of the aerospace vehicle to preempt the undesired state.

The process provides an innovative technical solution of relaxing, based upon the BDE adaptor preempting the onset of the undesired state, a constraint imposed on a control law for the aerospace vehicle. The process may include the BDE adaptor applying a complementary filter to simplify a filtering model and to eliminate propagating dynamics of states, other than airspeed of the aerospace vehicle, forward in time as the control law generates a command for a control element of the aerospace vehicle.

Further, an illustrative example describes a system, that includes: a control element of an aerospace vehicle; and a flight control system coupled to the at least one control element, such that the flight control system includes: sensors configured to measure at least an airspeed of the aerospace vehicle; and an adaptor that includes a processor that includes code specially programmed to: replace a signal, from a sensor of the sensors on the aerospace vehicle input to a control augmentation system, with a predicted airspeed; estimate, based upon the predicted airspeed, an onset and characteristics of an undesired state of the aerospace vehicle; derive, based upon an estimation of the onset and the characteristics of the undesired state, a command prior to the onset of the undesired state for preempting the onset of the undesired state; issue the command to the control element of the aerospace vehicle to preempt the undesired state; and relax, based upon a preemption by the adaptor of the onset of the undesired state, a constraint imposed on a control law for the aerospace vehicle. The system may further include the adaptor configured to reduce, compared to a control augmentation system that lacks the adaptor, an amount of flight test required of the aerospace vehicle to produce aerodynamic data required for the control augmentation system to avoid an undesired aerodynamic state of the aerospace vehicle during flight of the aerospace vehicle. The system may also include the adaptor configured with a numerical analysis tool that comprises direct nonlinear multi-degree-of-freedom analysis rules, in lieu of a trajectory optimization tool, that leverages knowledge of an aerodynamic database and eliminates a duplication requirement for aerodynamic models from simulation optimization programs that derive direct trajectory optimization based upon nonlinear programs and collocation, or linear models that solve Riccati equations.

The adaptor in the system may also be configured to: derive the command, based upon an estimate of a Mach dependent aerodynamic disturbance, that preempts the undesired state of the aerospace vehicle; and reduce a requirement to update an aerodynamic model in the control augmentation system. The control augmentation system may include a digital control system.

Still another example may be a machine configured to enhance flight characteristics for an aerospace vehicle, the machine being a BDE (Bhan-Donahue-Endres) adaptor that comprises a specially programmed processor that includes rules to: modify a control augmentation system on the aerospace vehicle, to preclude an undesired state of the aerospace vehicle unpredicted by aerodynamic data forming a control law for the control augmentation system; form a prediction for an airspeed of the aerospace vehicle that replaces an airspeed input from a sensor of the aerospace vehicle, in a phase of operation prone to instrumentation error, into the control augmentation system; generate an estimate, based upon the prediction, of an anticipated disturbance to a desired state of the aerospace vehicle; and generate, based upon the estimate, a command to a control element of the aerospace vehicle that preempts the undesired state of the aerospace vehicle. The control augmentation system may include a digital control system. The undesired state may include a pitch disturbance. The aerospace vehicle of the example may be configured for transonic flight. The machine may also include the BDE adaptor configured to relax, based upon a preemption by the BDE adaptor of an onset of the undesired state, a constraint imposed on the control law for the aerospace vehicle. The features and functions can be achieved independently in various examples of the present disclosure or may be combined in yet other examples in which further details can be seen with reference to the following description and drawings.

Clause 1: A process comprising correcting for errors in signals, from sensors on an aerospace vehicle, being input to a control augmentation system for the aerospace vehicle, via: deriving a predicted airspeed for the aerospace vehicle in an adaptor in a processor comprising code specially programmed for replacing the signals being input to the control augmentation system with the predicted airspeed; estimating, using the adaptor and the predicted airspeed, an onset and characteristics of an undesired state of the aerospace vehicle; deriving, using the adaptor and an estimation of the onset and the characteristics of the undesired state, a command prior to the onset of the undesired state and precluding the onset of the undesired state; and issuing the command to a control element of the aerospace vehicle to preempt the undesired state.

Clause 2: The process of Clause 1, wherein the aerospace vehicle is an aircraft comprising a control augmentation system.

Clause 3: The process of Clause 1 or 2, wherein the predicted airspeed is derived by a length of time preceding a time predicted, for an occurrence of the predicted airspeed, that is greater than a time period required for generating and executing the command.

Clause 4: The process of Clause 3, further comprising the length of time being at least about 0.5 seconds.

Clause 5: The process of any of Clauses 1-4, wherein the undesired state comprises transonic pitch disturbances to the aerospace vehicle.

Clause 6: The process of any of Clauses 1-5, further comprising expanding an operating envelope allowed by the control augmentation system for the aerospace vehicle.

Clause 7: The process of any of Clauses 1-6, further comprising expanding a flight performance envelope for the aerospace vehicle via relaxing constraints on a control law for the aerospace vehicle.

Clause 8: The process of any of Clauses 1-7, wherein the aerospace vehicle is an aircraft configured for transonic flight.

Clause 9: A process for expanding an operating envelope for an aerospace vehicle, the process comprising inserting a BDE adaptor onto a control augmentation system for the aerospace vehicle, the BDE adaptor comprising a processor comprising code specially programmed for: replacing a signal from a sensor on the aerospace vehicle being input to the control augmentation system with a predicted airspeed; estimating, using the predicted airspeed, an onset and characteristics of an undesired state of the aerospace vehicle; deriving, using an estimation of the onset and the characteristics of the undesired state, a command for preempting the onset of the undesired state prior to the onset of the undesired state; and preempting the undesired state via issuing, the command to a control element of the aerospace vehicle; and relaxing, based upon the BDE adaptor preempting the onset of the undesired state, a constraint imposed on a control law for the aerospace vehicle.

Clause 10: The process of Clause 9, wherein the BDE adaptor applies a complementary filter simplifying a filtering model and eliminating propagating dynamics of states, other than airspeed of the aerospace vehicle, forward in time as the control law generates a command for a control element of the aerospace vehicle.

Clause 11: A system that comprises a control element of an aerospace vehicle; and a flight control system coupled to the at least one control element, such that the flight control system comprises: sensors configured to measure at least an airspeed of the aerospace vehicle; and an adaptor that comprises a processor comprising code specially programmed to: replace a signal, from a sensor of the sensors on the aerospace vehicle input to a control augmentation system, with a predicted airspeed; estimate, based upon the predicted airspeed, an onset and characteristics of an undesired state of the aerospace vehicle; derive, based upon an estimation of the onset and the characteristics of the undesired state, a command prior to the onset of the undesired state to preempt the onset of the undesired state; issue the command to the control element of the aerospace vehicle to preempt the undesired state; and relax, based upon a preemption by the adaptor of the onset of the undesired state, a constraint imposed on a control law for the aerospace vehicle Clause 12: The system of Clause 11, further comprising the adaptor configured to reduce, compared to a control augmentation system that lacks the adaptor, an amount of flight test required of the aerospace vehicle to produce aerodynamic data required for the control augmentation system to avoid an undesired aerodynamic state of the aerospace vehicle during flight of the aerospace vehicle.

Clause 13: The system of Clause 11 or 12, further comprising the adaptor configured with a numerical analysis tool that comprises direct nonlinear multi-degree-of-freedom analysis rules, in lieu of a trajectory optimization tool, that leverages knowledge of an aerodynamic database and eliminates a duplication requirement for aerodynamic models from: simulation optimization programs that derive direct trajectory optimization based upon nonlinear programs and collocation, or linear models that solve Riccati equations.

Clause 14: The system of any of Clauses 11-13, further comprising the adaptor configured to derive the command, based upon an estimate of a Mach dependent aerodynamic disturbance, that preempts the undesired state of the aerospace vehicle and reduce a requirement to update an aerodynamic model in the control augmentation system.

Clause 15: The system of any of Clauses 11-14, wherein the control augmentation system comprises a digital control system.

Clause 16: A machine configured to enhance flight characteristics for an aerospace vehicle, the machine being a BDE (Bhan-Donahue-Endres) adaptor that comprises a specially programmed processor that comprises rules to modify a control augmentation system on the aerospace vehicle, to preclude an undesired state unaccounted for by control laws in the control augmentation systems of the aerospace vehicle; derive a prediction for an airspeed of the aerospace vehicle that replaces an airspeed input from a sensor of the aerospace vehicle, in a phase of operation prone to instrumentation error, into the control augmentation system; generate, based upon the prediction, a disturbance estimate to a desired state of the aerospace vehicle; and generate, based upon the estimate, a command to a control element of the aerospace vehicle that preempts the undesired state of the aerospace vehicle.

Clause 17: The machine of Clause 16, wherein the control augmentation system comprises a digital control system.

Clause 18: The machine of Clause 16 or 17, wherein the undesired state comprises a pitch disturbance.

Clause 19: The machine of any of Clauses 16-18, further comprising the aerospace vehicle configured for transonic flight.

Clause 20: The machine of any of Clauses 16-19, further comprising the BDE adaptor configured to relax, based upon a preemption by the BDE adaptor of an onset of the undesired state, a constraint imposed on the control law for the aerospace vehicle.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
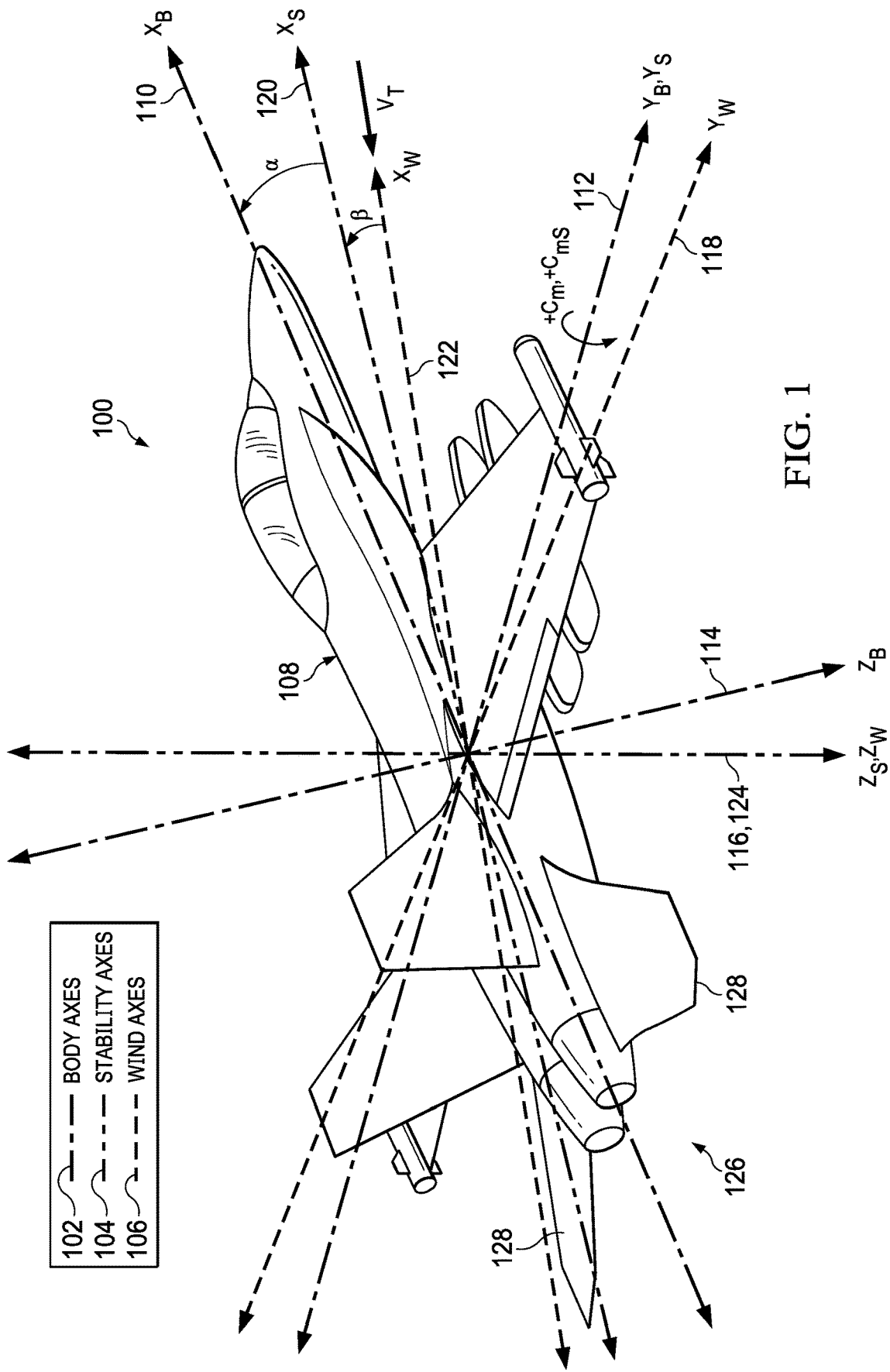
FIG. 1 is an illustration of axes of an aerospace vehicle in accordance with an illustrative example.

A control element on an aerospace vehicle may include an element that may control, without limitation, a movement, a trajectory, a configuration, an energy state, an orientation, a location in space, or combinations thereof, for the aerospace vehicle. A control element may include, without limitation, a control surface, an engine, some other system on the aerospace vehicle, or combinations thereof.

A flight control system may coordinate deflections of a control surface on an aerospace vehicle to produce a desired state of the aerospace vehicle. The desired state may include a desired trajectory for the aerospace vehicle. The desired trajectory for the aerospace vehicle may be described as a desired flight path for the aerospace vehicle.

Command of the control surface of an aerospace vehicle may be executed through mechanical connections between a control input unit and the control element. A control element may include any part of the aerospace vehicle that may control a state of the aerospace vehicle. Mechanical linkages may include mechanical mixers configured to apply control laws and/or gain and/or control load feel between the control input unit and the control surface.

Additionally, command of the control surface for an aerospace vehicle may be executed through a control augmentation system. A control augmentation system may include, without limitation, a digital control system. A digital control system may be, without limitation, a fly-by-wire (FBW) system. The control augmentation system may augment or replace mechanical flight controls of an aerospace vehicle with an electronic interface. As such, a control input unit may not be physically connected to the control surface, engine, or other system by cables, linkages, or other mechanical systems. Instead, the commands from a control input unit are converted to electronic signals transmitted by wires, optical fibers, over an air-interface, or some combination thereof, to an actuator at the control surface, engine, or other system. Further, with a control augmentation system, when an operator of an aerospace vehicle commands the aerospace vehicle perform a certain action, by using a control input unit, a flight control computer may then calculate what changes in a control element will cause the aerospace vehicle to perform the certain action and may issue the command to a controller for the control element.

The controller then moves actuators attached to the control element until it has moved to where the flight control computer commanded it to. Position of the control element and the state of the aerospace vehicle is then sensed and fed back to the flight control computer to form a closed loop to adjust the position of the control element until the aerospace vehicle is in the state desired by the operator. Hence, without limitation, with a closed loop control augmentation system, any movement away from a state indicated as desired by an input received by a control input unit may result in a signal from the computer, which can move a control element to stabilize the aircraft in the state indicated as desired, without an additional direct input from an operator of the aerospace vehicle.

A flight control computer may generate commands to a control element that may include a flight control surface, an engine, or other devices that control movement of the aerospace vehicle. A flight control computer in a control augmentation system may incorporate a processor programmed with some control laws to regulate stability, damping, responsiveness, or combinations thereof for the aerospace vehicle. With control augmentation, some commands to the control surface, engine, or other system, are not specifically directed by an input from a pilot to the control input unit.

The different components in a control augmentation system may communicate with each other using different types of communications architectures. A control augmentation system may use a data bus, such as those used in computer systems. The data bus may reduce the amount of wiring between components. Depending on the amount of traffic on the data bus, commands may reach intended components later than desired. A network may be used in addition to or in place of a data bus system to provide communications between processors, actuator control modules, and/or flight control modules. This situation creates a timing issue in which commands sent to a component, such as without limitation an actuator control module, may incur some delay in time before receipt and actuation of the commands.

For example, the delays in inputs for controlling a control surface may result in technological problems, including without limitation: undesired and/or unacceptable degraded human-machine handling quality, undesired and/or unacceptable excursions from structural operating limitations of the aerospace vehicle, the aerospace vehicle generating greater noise than desired, lower passenger comfort, or combinations thereof.

Still further, currently, performance of control laws for control augmentation systems suffer several technological limitations. Control law programs rely upon models based upon aerodynamic databases established by flight tests for a particular aerospace vehicle. Flight tests may be executed in a physical model of the aerospace vehicle, or wind tunnel. Simulations for flight tests may include modular multi-degree-of-freedom high-fidelity simulations of the complete aerospace vehicle that may include single and multi-rate model calling frequencies, analog and digital control system simulations, flat or rotating spherical earth equations of motion, military specification (MIL-SPEC) turbulence and airwake models, and open-loop analysis of control systems.

Multi-degree-of-freedom high-fidelity simulators may be used to analyze full multi-degree-of-freedom performance characteristics, flight control design evaluation, weapon separation characteristics and flight test program and reproduction of flight anomalies. Such high-fidelity simulations may be used to analyze structural limits and fatigue loads and flight control systems for all functional disciplines instead of a variety of uncoordinated special purpose tools and models previously used for analysis. This practice allows flight control law design engineers to check performance impact on an entire aerospace vehicle maneuver set rather than isolated checks on only limited portions of the an aerospace vehicle maneuver set.

However, despite potentially thousands of hours of flight test gathering of aerodynamic data, it is known that due to complexities, interactions, and interdependence of multiple factors affecting aerodynamic performance, including without limitation, multi-axis coupling effects, not all operating characteristics and aerodynamic data desired may be available in an aerodynamic database of a control system to guide rules in control laws processing inputs received by the control input unit into commands sent to actuate control elements for the aerospace vehicle.

A less than fully comprehensive aerodynamic database being available is even more likely for high-performance and/or highly maneuverable aerospace vehicles, including without limitation, fighter aircraft. Additionally, even if a complete database were available, it is known that a technological problem exists because in actual flight, actual performance information from air data sensors fed into a processor applying the control laws on the aerospace vehicle may inaccurately represent with a fidelity of the true air data that the aerospace vehicle is actually experiencing.

As a non-limiting example, tests indicate that uncertain and/or inaccurate instrumentation on an aerospace vehicle may cause errors in sensing a state of the aerospace vehicle. Improper sensed state of the aerospace vehicle may result in counterproductive inputs into a control augmentation system for the aerospace vehicle. Hence, there is a technological problem for control of an aerospace vehicle, whereby in certain portions of an operating envelope for the aerospace vehicle, due to particular aerodynamic characteristics of the aerospace vehicle and/or air data instrumentation errors, a desired state for the aerospace vehicle may not be maintained by control inputs. Without limitation the instrumentation errors may include Mach source-error.

Errors sensing the state of the aerospace vehicle can result in very difficult flight control transonic gain scheduling. Instrument errors and aerodynamic disturbances can also exacerbate problems of flight control transonic gain scheduling if the gains are scheduled with too fine of breakpoints. Large gain changes over small state increments can lead to undesired characteristics when instrument error drives production gains away from where they should be for the true solution.

Thus, a command input to a control augmentation system that holds the aerospace vehicle in level-flight experiencing a constant 1 g load as it approaches an aerodynamic disturbance—if left unchanged—could result in unintentional and undesired change in the state of the aerospace vehicle that could include changes that generate unintended movement and loading that may result in an unintended trajectory or loading on the aerospace vehicle.

In some cases, under certain aerodynamic conditions, small changes in a control element of the aerospace vehicle can result in unexpectedly large responses to changes in a state of the aerospace vehicle, as compared to changes those same inputs would produce under other aerodynamic conditions. As a non-limiting example, a change of Mach can significantly change aerodynamic conditions for an aerospace vehicle and cause an aerodynamic disturbance to a desired state for the aerospace vehicle. Hence, in a non-limiting example, if holding a control input neutral, as is normally done to maintain level flight with a normal load of 1 g for a given airspeed, the aerospace vehicle could experience an undesired aerodynamic disturbance and effects therefrom similar to a significant change in a position of a control element of the aerospace vehicle.

Currently, when such unintentional and undesired aerospace vehicle performance characteristics are discovered, either in design, test, or during operational flights of the aerospace vehicle, exceedance of structural and/or other limitations for the aerospace vehicle are prevented by expensive and time intensive updating or replacing an aerodynamic database or of gains and/or embedded flying qualities programmed into control laws for the aerospace vehicle. Such updating or replacing are very time intensive and costly at least because of the interrelated nature of the flight controls and body shapes of an aerospace vehicle with stability, responsiveness, dampening, and frequency, characteristics an aerospace vehicle.

An alternate current solution to unintentional and undesired aerospace vehicle performance characteristics are discovered, either in design, test, or during operational flights of the aerospace vehicle, that may cause exceedance of structural and/or other limitations for the aerospace vehicle is to add a load limiter that constrains the control laws governing the control elements on the aerospace vehicle. Constraints applied by a load limiter may filter out or cancel inputs during operations in particular parts of an operating envelope for the aerospace vehicle. Although constraints applied may prevent exceeding structural and/or other limits for the aerospace vehicle, they may also create a further technological difficulty of restricting an operational envelope available to an operator of the aerospace vehicle to less than the original operational and structural limits of the aerospace vehicle. As a non-limiting example, commands to a control element for the aerospace vehicle may be constrained, such that regardless of an input received from a control input unit during flight through a particular flight region, commands to a control element would not exceed commanding a constrained level of change in order to prevent effects of an instrumentation error and/or aerodynamic effects not fully accounted for in an aerodynamic database or full control laws of the aerospace vehicle from causing an exceedance of a structural limit for the aerospace vehicle. Hence, the aerospace vehicle suffers the technological problem of being constrained from utilizing a full structural envelope of the aerospace vehicle in the flight region for which commands have been constrained. In other words, as a non-limiting example, instead of being able to command a maneuver for the aerospace vehicle fully to a structural limit during flight in the particular flight region, the command is constrained from reaching the control element and thus the operating envelope of the aerospace vehicle is reduced from its originally designed structural limits.

Therefore, it would be desirable to have a method and apparatus that take into account at least some of the issues discussed above, as well as other possible issues. For example, it would be desirable to have a method and apparatus that reduce issues that limit an aerospace vehicle's available operating envelope due to unintended, undesirable, and/or inconsistent aerodynamic characteristics.

The illustrative examples recognize and take into account one or more different considerations. As a non-limiting example, the illustrative examples recognize and take into account that when transitioning through some parts of an operating envelope of an aerospace vehicle, the aerospace vehicle may experience changes in aerodynamic characteristics that can cause unintended and/or undesired motion that requires a change to existing control elements of the aerospace vehicle in order to achieve an intended and/or desired state and/or trajectory of the aerospace vehicle.

The illustrative examples recognize and take into account that in some parts of the operating envelope of the aerospace vehicle, air data measurements from sensors of the aerospace vehicle may become inaccurate. The combination of inaccurate air data and changes in aerodynamic characteristics of the aerospace vehicle may cause control element movements to lag behind from helpful and/or intended positions. As a result, commands to control elements in the aerospace vehicle may aggravate instead of mitigate an unintended and/or undesirable state and/or trajectory of the aerospace vehicle operating through or in some parts of the operating envelope.

In other words, the illustrative examples recognize and take into account that current control laws and control augmentation systems suffer the technological problem of constraint tightening an operating envelope for an aerospace vehicle that limits command authority over flight control systems for an aerospace vehicle and/or can cause other aerodynamic problems or limitations to performance. Without limitation, constraints applied to an operating envelope of an aerospace vehicle can cause an inability to push the nose of an aerospace vehicle down in the transonic regime, which may remove a capability of a pilot to unload an aerospace vehicle as desired. Such constraints can result in incomplete operational testing and aerodynamic data tables for operational control law programming and flight of an aerospace vehicle.

Without limitation, another issue caused by current technology constraints may be that when the aerospace vehicle experiences a transonic pitch-up when going supersonic, a pilot may not be able to stop an altitude increase even when pushing full forward on the stick. Additionally, more complex approaches than constraints still do not adapt in flight and inevitably are limited by breadth and fidelity of an aerodynamic database, and hence require significant additional flight testing to provide updating to an aerodynamic database for the aerospace vehicle.

In contrast, examples illustrated herein can be attached to an aerospace vehicle and provide an adaptive estimate, of an exogenous aerodynamic disturbance and its effects on a dynamic response and state of the aerospace vehicle, that is uncoupled from an existing aerodynamic database on an aerospace vehicle. The illustrative examples recognize and take into account that even advanced currently existing control augmentation systems have not produced technical solutions to avoid aerodynamic disturbances such as, without limitation, an F-15 Bitburg roll, due to their inability to predict, due at least to poor or incorrect source error corrections, the onset of the exogenous aerodynamic disturbances. In contrast, a predictor component in the illustrative examples removes source error influences as it constructs an estimated disturbance.

The illustrative examples also recognize and take into account that other solutions require wrapping loops around an existing control, changing the gains of a baseline controller, or wholescale redesign of a control augmentation system. In contrast, the illustrative examples herein can be added to any existing control system and thus can overcome undesired exogeneous aerodynamic disturbances on an aerospace vehicle even if they only become apparent after the aerospace vehicle is flying in post manufacturing operations.

The illustrative examples recognize and take into account that a set of axes used to describe an orientation of an aerospace vehicle may be selected from, without limitation, a body axes, a stability axes, or a wind axes as shown by FIG. 1. FIG. 1 is an illustration of axes of an aerospace vehicle depicted in accordance with an illustrative example. Specifically, motion of and forces on aerospace vehicle 100 may be represented by body axes 102, stability axes 104, and/or wind axes 106. Body axes 102 may be fixed relative to structure 108 of aerospace vehicle 100 and comprise longitudinal (or roll) axis $X_B$ 110, lateral (or pitch) axis $Y_B$ 112, and directional (or yaw) axis $Z_B$ 114 orthogonal to both $X_B$ 110 and $Y_B$ 112. The stability axes may be fixed such that stability axis $Z_S$ 116 aligns with a vector of the Earth's force of gravity. Stability axis $Y_S$ 112 aligns with pitch axis $Y_B$ 112, and stability axis $X_S$ 120 is orthogonal to both $Y_S$ 118 and $Z_S$ 116 and aligned with roll axis $X_B$ 110 in an $X_B$-$Z_B$ plane of body axes. Wind axes may be fixed by a trajectory through space of the aerospace vehicle 100, such that wind axis $X_W$ 122 aligns with a trajectory of the aerospace vehicle 100 in an $X_S$-$Y_S$ plane of stability axes 104, wind axis $Z_W$ 124 aligns with stability axis $Z_S$ 116, and wind axis $Y_W$ 118 is orthogonal to both axes $X_S$ 120 and $Z_S$ 116. Without limitation, aerospace vehicle 100 may be an aircraft. Without limitation, aerospace vehicle 100 may be an aircraft capable of transonic flight, such as, without limitation, an F-15 aircraft.

Aerospace vehicle 100 may have a pitch control element. The pitch control element may control movement of aerospace vehicle 100 at least about pitch axis $Y_B$ 112. Without limitation, the pitch control element may be a horizontal stabilizer or a set of stabilators 128. Without limitation, stabilators 128 may be mounted on an empennage or tail 126 of aerospace vehicle 100.

The illustrative examples recognize and take into account that the use of buses, such as those used in computers, is becoming more common in aircraft. For example, flight control modules may send commands to actuator control modules to control devices in the aircraft. Actuator control modules may control, for example, a flight control surface, an engine, or some other suitable device in the aircraft. With these types of buses, the timing of when commands sent from a flight control module are received by an actuator control module for processing must be considered in determining what commands are sent when.

The illustrative examples recognize and take into account that a bus may be a parallel bus or a serial bus. When a parallel bus is used, units of data, such as a word, may be carried on multiple paths in the bus. Depending on the traffic and other conditions, the time needed for a unit of data to reach an actuator control module must be considered in determining what commands are sent when.

A "group of," as used herein, when used with reference to items, means one or more items. For example, a group of actuator control modules is one or more actuator control modules.

The illustrative examples recognize and take into account that, as a non-limiting example, tests of aerospace vehicles indicate that uncertain and/or unstable instrumentation on an aerospace vehicle may produce errors in a sensed state of the aerospace vehicle. As one non-limiting example, errors of sensors used to derive Mach for an aerospace vehicle may be in error by as much as 0.06 Mach from the actual Mach of the aerospace vehicle when the aerospace vehicle is at transonic speeds between 0.9 to 1.1 Mach. Hence, there is a technological problem for control of an aerospace vehicle, whereby in certain portions of an operating envelope for the aerospace vehicle, due to particular aerodynamic characteristics of the aerospace vehicle and/or air data instrumentation errors, a desired state for the aerospace vehicle may not be maintained by stable or neutral control inputs. Without limitation, the instrumentation errors may include Mach source-error.

Mach source-error, in combination with the known transonic pitching moment "aerodynamic cliff" further described below, makes for very difficult flight control transonic gain scheduling. Mach source-error in combination with the known transonic pitching moment "aerodynamic cliff" can also exacerbate problems of flight control transonic gain scheduling in pitch if the gains are scheduled with too fine of breakpoints. Large gain changes over small Mach increments can lead to undesired characteristics when the Mach source-error drives production gains away from where they should be for the true solution.

As a non-limiting example, as an aerospace vehicle transitions through the transonic speed range of 0.9 to 1.1 Mach, a pitching moment coefficient of the aerospace vehicle may be rapidly changing, and thus, a pitch command input that holds the aerospace vehicle in level flight experiencing a constant 1 g load as it approaches the transonic Mach—if left unchanged—could result in an unintentional and undesired change in the state of the aerospace vehicle that could include changes to a pitching moment of the aerospace vehicle that generates over 2 g's and an unintentional and undesired climb away from desired level flight. The "g" unit represents a force equal to the Earth's force of gravity applied along body axis $Z_B$ 114 perpendicular to longitudinal axis $X_B$ 110 through the body of aerospace vehicle 100, and is called positive when acting in a direction, which would push a pilot in aerospace vehicle 100 down into his seat, and called negative when acting in a direction, which would pull a pilot up out of his seat.

Figure 2:
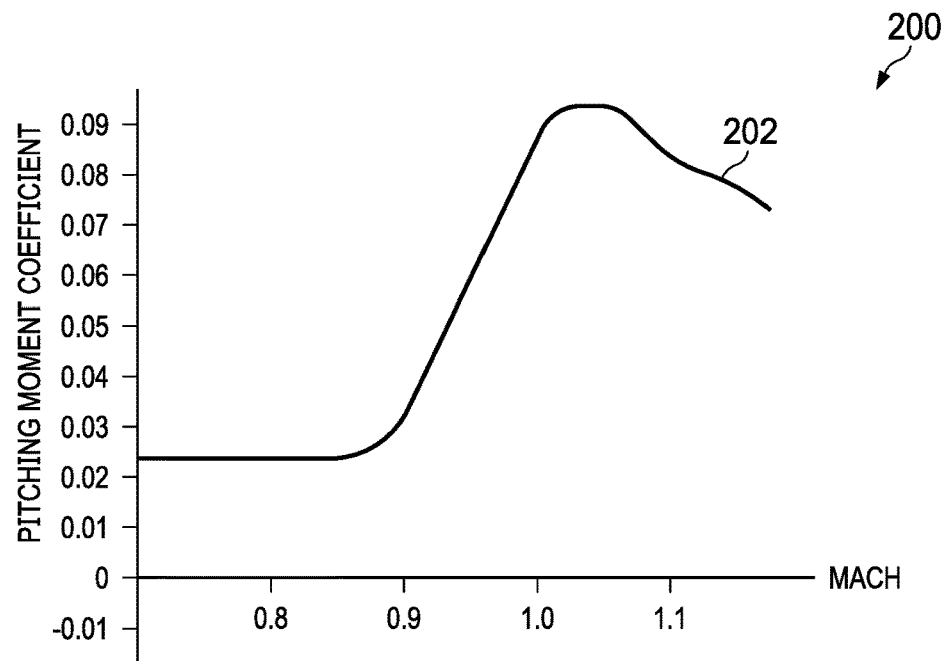
FIG. 2 is an illustration of a chart showing a representative change in a pitching moment coefficient for an example aerospace vehicle as a Mach speed of the example aerospace vehicle changes in accordance with an illustrative example.

Looking now to FIG. 2, an illustration of a chart showing a representative change in a pitching moment coefficient for an example aerospace vehicle as a Mach (aircraft speed normalized by the speed of sound) of the example aerospace vehicle changes is depicted in accordance with an illustrative example. Specifically, chart 200 shows plot 202 representing an example of average values from flight tests for pitching moment coefficient along the vertical axis and a Mach speed along the horizontal axis for an example aerospace vehicle. For the example aerospace vehicle represented by chart 200 in FIG. 2, each 0.01 change in the pitching moment coefficient generates a change in the pitch of the aerospace vehicle approximately equal to a pitch change that would be caused by a one degree change in a deflection of a pitch control element of the aerospace vehicle.

Thus, from FIG. 2, one can see that merely accelerating from 0.9 Mach to 1.0 Mach can cause a significant aerodynamic disturbance to a desired state for the aerospace vehicle. That transonic acceleration can change the pitching moment coefficient from 0.025 to 0.085. Thus, FIG. 2 shows a "Mach cliff" for pitching moment coefficient as the aerospace vehicle transitions between 0.9 and 1.0 Mach. The term "Mach cliff" indicates the rapid change in pitching moment coefficient values for the example aircraft as Mach changes, which appears like the steep cliff of a mountain side for plot 202 between Mach 0.9 and 1.0 in FIG. 2.

Figure 3:
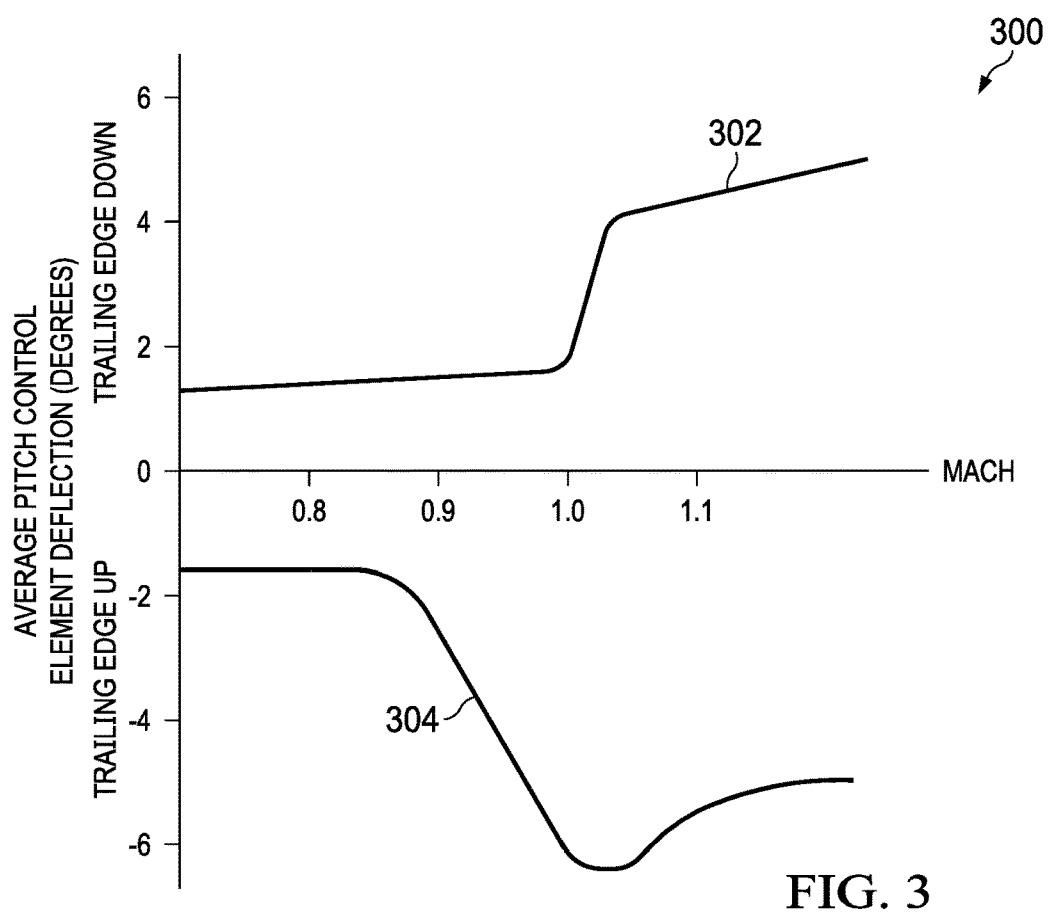
FIG. 3 is an illustration of a plot of an angle of deflection of a pitch control element to maintain level flight at 1 "g" as Mach changes in accordance with an illustrative example.

Likewise, FIG. 3 represents the "Mach cliff" in terms of adjustment needed in a pitch control element of the example aerospace vehicle to keep the example aerospace vehicle flying at a constant altitude in stable 1 g flight as it transitions through transonic Mach speeds. FIG. 3 is an illustration of a plot of an average angle of deflection of a pitch control element to maintain level flight at 1 g as Mach changes depicted in accordance with an illustrative example. Specifically, chart 300 shows values for a deflection in degrees of a pitch control element of the example aerospace vehicle of FIG. 2 along a vertical axis plotted against the equivalent Mach speed of the example aerospace vehicle of FIG. 2 along a horizontal axis. Plot 302 represents a plot of average values from a flight test for constant altitude flight under a 1 g load (in the axis $Z_S$ 116 of FIG. 1) at a pressure altitude of 2,000 feet above mean sea level of average values from the flight test. Plot 304 represents an example of a plot of average values from a flight test for constant altitude (in the axis $Z_S$ 116 of FIG. 1) flight under a 1 g load (in the axis $Z_B$ 114 of FIG. 1) at a pressure altitude of 40,000 feet above mean sea level. Both plot 302 and plot 304 demonstrate a "Mach cliff" in the transonic range indicating that aerodynamic disturbances in that flight region require a significant change in the degree of deflection needed from a pitch control element to keep the trajectory for the example aerospace vehicle in level (in the axis $Z_S$ 116 of FIG. 1) flight under a 1 g load (in the axis $Z_B$ 114 of FIG. 1).

Chart 200 shows that changing Mach through the transonic region may result in a change in pitching moment coefficient of the example aerospace vehicle by approximately 0.6. Hence, in a non-limiting example, if holding a control input neutral, as is normally done to maintain level flight with a normal load of 1 g for a given airspeed, as the Mach transitions through the transonic region, the aerospace vehicle would experience the undesired aerodynamic disturbance equivalent to a pitch up and an increase in "g" loading caused by a 6 degree movement of a pitch control element.

In other words, as another non-limiting example, a pitch command input that held the aerospace vehicle in a steady vertical force of −1 g, if left unchanged as the aerospace vehicle decelerates from 1.0 to 0.9 Mach, could generate an unintentional and undesired change in negative "g" forces that exceeds a structural limit for the aerospace vehicle.

The illustrative examples recognize and take into account that currently, when such unintentional and undesired aerospace vehicle performance characteristics are discovered, either in design, test, or during operational flights of the aerospace vehicle, prevention of exceedance of structural and/or other limitations for the aerospace vehicle may involve expensive and time intensive redesign and/or restructuring of an aerodynamic database and/or of gains and/or embedded flying qualities programmed into control laws of a control augmentation system for the aerospace vehicle. Such redesign and/or restructuring are very time intensive and costly at least because of the interrelated nature of the flight control and body shape effects of an aerospace vehicle with stability, responsiveness, dampening, and frequency, characteristics of an aerospace vehicle.

Alternatively, unintentional and undesired aerospace vehicle performance characteristics have been more quickly or simply avoided by adding constraints onto the control laws governing commands sent to the control elements on the aerospace vehicle. The constraints added may broadly filter out or cancel inputs in particular parts of an operating envelope for the aerospace vehicle.

Although constraints applied may prevent exceeding structural and/or other limits for the aerospace vehicle, they may also create a further technological difficulty of restricting an operational envelope available to an operator of the aerospace vehicle to less than the original structural limits of the aerospace vehicle. As a non-limiting example, commands to a pitch controller for the aerospace vehicle described above may be constrained, such that, regardless of an input received from a pitch control input unit during flight through the transonic region, commands to a pitch control element would not exceed commanding a pitch change for a normal load (loading along axis $Z_B$ 114) below some value such as 0.5 "g" in order to prevent effects of an instrumentation error and/or aerodynamic effects not fully accounted for in an aerodynamic database of the aerospace vehicle from causing an exceedance of a negative "g" limit for the aerospace vehicle. Hence, the aerospace vehicle suffers the technological problem of being constrained from utilizing a full structural envelope of negative "g" limits at transonic speeds. In other words, as a non-limiting example, instead of being able to command a maneuver for the aerospace vehicle to a limit of negative 2 g's during flight in the transonic Mach region, the pitch commands may be filtered out to only allow commanding a 0.5 g unload despite the structural limit (and operator's desired command) being −2 g's.

A control augmentation system may be a proportional-integral (PI) error regulator that transforms the linearized aircraft dynamics to a canonical second order linear system. Control laws in a flight control computer for the control augmentation system may intend to address stability and control pitching moments $C_{MB}$ about axis $Y_B$ 112 shown in FIG. 1.

As a non-limiting example, the output realized by an aerospace vehicle for a command from a flight control computer to set a deflection of a pitch control element of an aerospace vehicle may be determined by three components: a deaugmentation, a reaugmentation, and a function for trim of a pitch control element that intends to keep a change in a pitch rate of the aerospace vehicle at zero, which we shall call "Trim Tail." Trim tail depends upon factors that include at least: a configuration, a center of gravity location (cg), an angle of attack (α), a Mach, and an altitude of the aerospace vehicle. Deaugmentation may be a linear feedback that intends to keep the aerospace vehicle pitch stability neutral. Reaugmentation may be a linear feedback that intends to cause the aerospace vehicle to track commands for a desired angle of attack. Represented as a $2^{nd}$ order transfer function, reaugmentation ω may be expressed as:

$$\omega = \left( \frac{\omega^2(s+L_\alpha)}{s}(r-\alpha) - 2\zeta\omega q \right) \quad [1]$$

In equation [1], for the aerospace vehicle: ω represents a natural short period frequency of pitch, and ζ represents a damping of pitch. In equation [1], s represents a complex Laplace variable that represents differentiation in the frequency domain, so that second order differential equations are converted to quadratic algebraic equations. In equation [1], complex Laplace variable s comprises a real part that is related to rate of exponential growth or decay, and an imaginary part that is related to a frequency of oscillation of solutions to the linear differential equations that ideally describe the aircraft. In equation [1], $L_\alpha$ represents a slope of a lift curve, α represents an angle of attack, and r represents an input to control input unit 402 for a deflection of a pitch control element. Hence, a control augmentation may allow design flying qualities of the aerospace vehicle that include, without limitation, handling characteristics, responsiveness, and stability, via control laws that control two parameters, the natural short period frequency, ω, and the damping, ζ.

Figure 4:
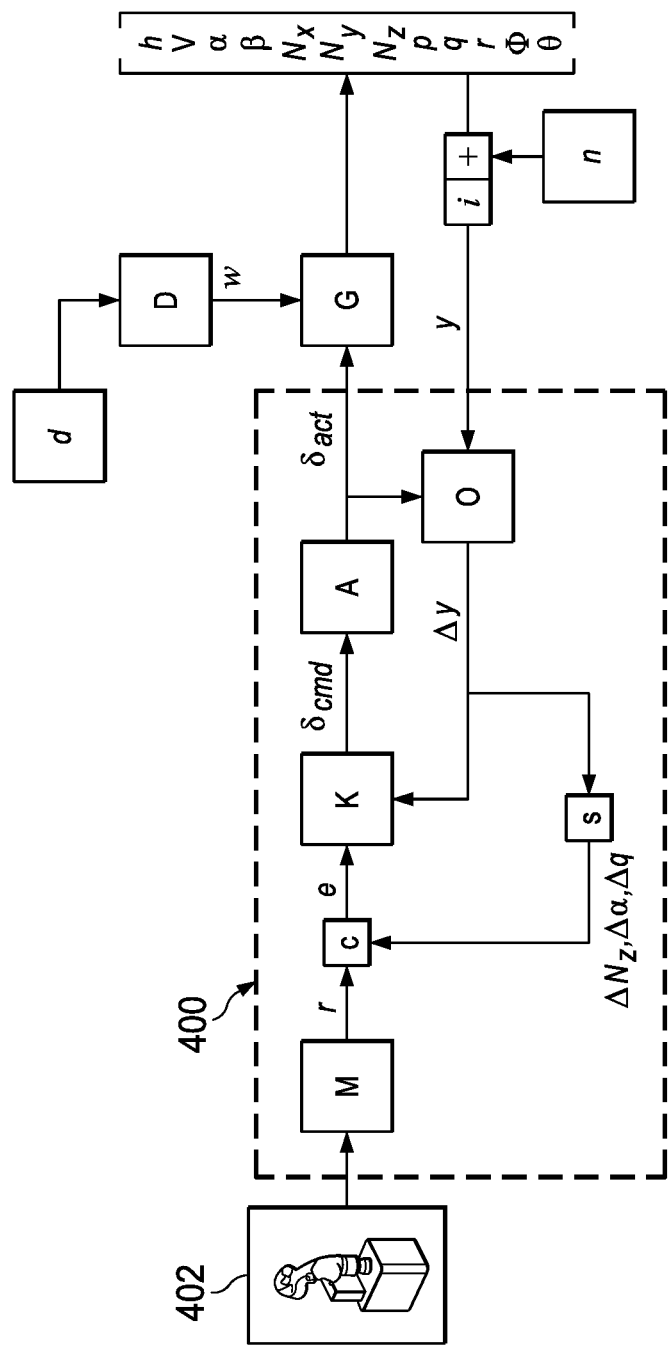
FIG. 4 is an illustration of a block diagram of a portion for pitch control in a control augmentation system in accordance with an illustrative example.

A block diagram of a current pitch control augmentation system may help one to visualize a technological problem of handling aerodynamic disturbances with a current control augmentation in aerospace vehicles. FIG. 4 is an illustration of a block diagram of a portion for pitch control in a control augmentation system depicted in accordance with an illustrative example. Specifically, FIG. 4 shows a portion for pitch control in linear feedback closed loop control augmentation system 400, which, without limitation, may represent a control augmentation system found on a current aerospace vehicle. Without limitation, linear feedback closed loop control augmentation system 400 may be configured to control of a state of aerospace vehicle 100 as shown in FIG. 1. The output of linear feedback closed loop control augmentation system 400, is dynamic response G establishing a state y of an aerospace vehicle, such as without limitation, aerospace vehicle 100 from FIG. 1. Without limitation, state, y, of aerospace vehicle 100 may be described as a vector with many parameters, among which are included, without limitation: V, velocity; $\alpha$, angle of attack; $\Phi$, roll angle; $\theta$, pitch angle; q, pitch rate; p, roll rate; r, yaw rate; $N_z$, acceleration on axis $Z_B$ 114 shown in FIG. 1; $N_y$, acceleration on axis $Y_B$ 112 shown in FIG. 1; $N_x$, acceleration on axis $X_B$ 110 shown in FIG. 1; $\beta$, sideslip angle; and h, altitude, for the aerospace vehicle.

An exogenous aerodynamic disturbance, d, may corrupt dynamic response, G, of an aerospace vehicle, such as, without limitation, aerospace vehicle 100 shown in FIG. 1. Exogenous aerodynamic disturbance, d, is considered exogenous and a disturbance to linear feedback closed loop control augmentation system 400 because it is an input to linear feedback closed loop control augmentation system 400 that has linear feedback closed loop control augmentation system 400 no direct control over. As a non-limiting example, Mach may be considered an exogenous disturbance d because Mach is not directly controlled by a control input of linear feedback closed loop control augmentation system 400.

A corruption to dynamic response, G, may be an alteration of dynamic response, G, away from a desired state for aerospace vehicle 100 intended by an input from control input unit 402. Exogenous aerodynamic disturbance, d, may be represented by disturbance transfer function, D, that produces a disturbance signal w, representing an impact of exogenous disturbance, d, on dynamic response, G, of aerospace vehicle 100. Disturbance transfer function, D, outputs disturbance signal w that combined with an aerodynamic response of aerospace vehicle 100 to actual deflection $\delta_{act}$ of a control element of aerospace vehicle 100 produces dynamic response, G, of aerospace vehicle 100. Dynamic response, G, of the aerospace vehicle may be represented as producing state, y, which includes the actual "g" load experienced along axis $Z_B$ 114 in FIG. 1, or the normal load for the aerospace vehicle, represented in FIG. 4 by $N_z$.

In FIG. 4, which illustrates a pitch portion of linear feedback closed loop control augmentation system 400, values of parameters included in the vector describing state, y, of aerospace vehicle 100 may be measured by instrumentation, I, and fed back to control augmentation processor, K, through observer, O. A control augmentation processor, such as control augmentation processor, K, shown in FIG. 4, may be designed and implemented, without limitation, as a linear feedback control augmentation processor.

Observer, O, may be a Kalman filter, or some other computational approach that serves to transform signals for state, y, parameters into state-estimates $\Delta y$ that are usable by control augmentation processor, K. As used here, the "$\Delta$" symbol is not used to indicate a change in an actual state, y, but instead indicates that the values used as representations of actual state, y, are an estimate of state, y. In other words, observer, O, may be a component configured to serve as a state-estimator that may be specially programmed to: exclude unwanted features, transform, or reconstruct or fill-in missing or unmeasurable portions, or combinations thereof, for signals of measurements of state, y, heading for control augmentation processor, K. State, y, signals headed to observer, O, may be provided by instrumentation, i that may: sense, be susceptible to, or propagate noise, n. In other words, noise, n, may be an unwanted feature filtered out by observer, O. Noise, n, may include, without limitation, an instrument source error. In other words, noise, n, indicates that measurements of parameters for state, y, may have noise, n, that should be filtered before being entered into control augmentation processor, K.

Selector, s, may be a component specially programmed to select signals from $\Delta y$ to input to comparator c to derive error, e, fed into control augmentation processor, K. Thus, for the pitch portion of the linear feedback for, without limitation, closed loop control augmentation system 400 in FIG. 4, selector s may select from $\Delta y$ pitch control pitch related parameters of $\Delta N_z$, $\Delta q$, and $\Delta \alpha$.

Control augmentation processor, K, receives an initial desired performance input from control input unit 402, which is received as a signal fed into model, M, which models the initial desired performance input into an electrical signal in a format receivable as reference, r, used by comparator, C, and controls desired performance input from control input unit 402 may be a desired pitch angle for aerospace vehicle 100. Control augmentation processor, K, receives reference, r, and an error, e, from comparator, C, and outputs pitch control element deflection control command, $\delta_{cmd}$, to actuator, A, for a pitch control element that produces an actual pitch control element deflection command that yields actual deflection of the pitch control element, $\delta_{act}$. Actual deflection of the pitch control element, $\delta_{act}$, results in some dynamic response to actual deflection $\delta_{act}$ by aerospace vehicle 100.

As a non-limiting example, where the exogenous aerodynamic disturbance, d is, Mach-driven, disturbance transfer function, D, may have components $D_1$ and $D_2$ (not shown in the figures). $D_1$ may be a Mach-driven disturbance due to q (pitch rate) dynamics, and $D_2$ may be a Mach-driven disturbance due to $\alpha$ (angle of attack) dynamics.

Thus, a technological problem is evident that an accurate method for applying disturbance transfer function, D, is necessary in order to accurately determine dynamic response, G, and thus state, y, shown in FIG. 4, and thus to adapt the control laws of control augmentation processor, K, as needed to determine a pitch control element deflection control command, $\delta_{cmd}$, needed to produce a desired dynamic response, G, and thus, a desired state, y, output for aerospace vehicle 100.

However, to date, control augmentation systems have been unable to predict, from measurements available from real-time air data sensors, future velocity states for the aerospace vehicle with an accuracy necessary to predict within a time period necessary, for determining in control augmentation processor, K, and applying through actuator subsystem, A, a control deflection necessary to properly deaugment (via anticipatory control deflection commands) augmentation effects of anticipated exogenous aerodynamic disturbance, d.

As a non-limiting example, if current control laws included: a deaugmentation factor based upon a perfect knowledge of actual Mach for the aerospace vehicle, and a direct effect of Mach disturbance onto aircraft angle of attack, α, is minimal relative to the effects of Mach on pitch rate response, the control laws might include a reliable disturbance to a pitching moment coefficient for the aerospace vehicle at each Mach number, and one could assume that the control laws could be scaled to reject true disturbance effects of Mach on pitch control. To date, a technological problem exists that such control law solutions do not exist for aerodynamic disturbances in regions where perfect knowledge of Mach for the aerospace vehicle does not exist and direct effect of Mach onto aircraft angle of attack, α, is not minimal.

Thus, a solution is required that departs from traditional feedback-based control systems to determine an effective feed-forward control input augmentation that effectively learns to predict and counter the aerodynamic disturbance on the aerospace vehicle from block D when perfect knowledge of a factor affecting the disturbance does not exist, and the direct effect of a factor upon a state of the aerospace vehicle is not minimal.

In contrast to existing feedback control law-based control augmentation systems, which are error-dependent control systems using functions of feedback on errors of state relative to command, a feed-forward control law is a time or model-dependent control law that does not depend on a feedback-based error signal. Attaching a feed-forward adaptor patch onto a feedback-based architecture of an existing control augmentation system requires stability analysis that allows for an interchange between feedback-based control laws and feed-forward-based control laws. The interchange includes replacing time dependence or model dependence with measurement dependence, or vice versa.

Specifically, for aerodynamic disturbances in the transonic range when Mach is not perfectly known and the direct effect of Mach on α may not be minimal, a technical solution is needed to provide an adaptor that can be applied onto control augmentation processor, K, as represented in FIG. 4, to overcome the inability of current control law programs in control augmentation processor, K, to produce an appropriate deaugmentation to a control input such that the aerospace vehicle may accelerate or decelerate through the transonic Mach region with neutral control input unit 402 for a pitch control element of the aerospace vehicle. Without limitation, as mentioned above, a pitch control element may be a horizontal stabilizer or a set of stabilators mounted at a tail of the aerospace vehicle.

To date, even theoretically, optimal feed-forward control law solutions have required exceedingly complex methods requiring applications of Pontryagin's maximum principle or the calculus of variations based on nonlinear matrix differential equations, known as the Riccati equations. Thus, a BDE (Bhan-Donahue-Endres) adaptor has been developed to produce a prediction for the disturbance transfer function of block D that can be fed as an open loop modification into block K such that effects of actual exogenous aerodynamic disturbance, d, are neutralized and the output, $\delta_{act}$, from block A produces state, y, for the aerospace vehicle that aligns with a state intended by inputs to input control unit 402.

Figure 5:
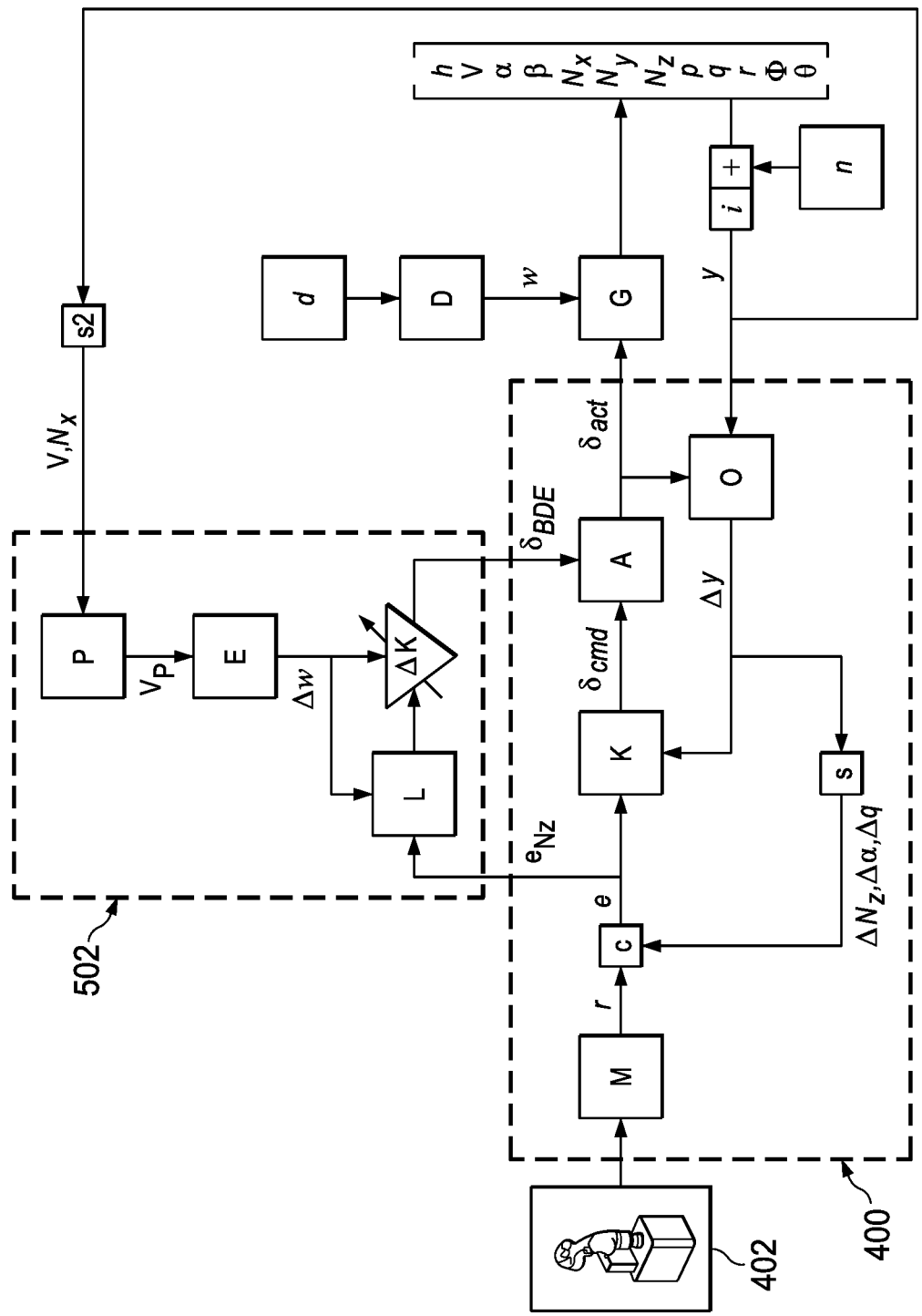
FIG. 5 is an illustration of a block diagram of a portion for pitch control in a control augmentation system with a BDE (Bhan-Donahue-Endres) adaptor attached in accordance with an illustrative example.

FIG. 5 is an illustration of a block diagram of a portion for pitch control in a control augmentation system with a BDE (Bhan-Donahue-Endres) adaptor attached depicted in accordance with an illustrative example. More specifically, FIG. 5 shows BDE adaptor 502 attached to linear feedback closed loop control augmentation system 400 of FIG. 4.

Structurally, BDE adaptor 502 may include a specially programmed processor that includes an algorithm that includes rules, such that BDE adaptor 502 may be attached to linear feedback closed loop control augmentation system 400 such that BDE adaptor 502 interfaces with control augmentation processor, K, to produce BDE command, $\delta_{BDE}$. BDE command, $\delta_{BDE}$ affects actual deflection, $\delta_{act}$, of a pitch control element by actuator, A, via a BDE adaptor 502 gain adjustment determined to preempt effects of a disturbance anticipated in a future time period set by a predicted velocity for aerospace vehicle 100. Actuator, A, represents an actuator for a control element for aerospace vehicle 100 in FIG. 1. As used in FIGS. 4 and 5, actuator, A, represents any number of control element actuators required, collectively or individually, for any number of control elements that may be needed to determine dynamic response, G, and state, y, for aerospace vehicle 100.

Thus, for FIGS. 4 and 5, which illustrate a portion for pitch control in a control augmentation system, actuator, A, represents, without limitation, at least an actuator required for a pitch control element (not shown) for aerospace vehicle 100. Hence, the rules applied by BDE adaptor 502 may generate a gain for control of aerospace vehicle 100 that evolves from disturbance estimate errors to adapt a required deaugmentation for a command to a control element of the aerospace vehicle via predicting a future airspeed of aerospace vehicle 100.

Without limitation, FIG. 5 illustrates the system and process for BDE adaptor 502 operations for pitch control. As shown in FIG. 4, the state, y, of the aerospace vehicle may be described by many variables, among which are included, without limitation: V, velocity; α, angle of attack; Φ, roll angle; θ, pitch angle; q, pitch rate; p, roll rate; r, yaw rate; $N_z$, acceleration on axis $Z_B$ 114 in FIG. 1; $N_y$, acceleration on axis $Y_B$ 112 in FIG. 1; $N_x$, acceleration on axis $X_B$ 110 in FIG. 1; β, sideslip angle; and h, altitude, for an aerospace vehicle, such as without limitation, aerospace vehicle 100 shown in FIG. 1.

FIG. 5 shows selector, s2, selecting only parameters, $N_x$, acceleration on axis $X_B$ 110, and velocity, V, from among state, y, parameters. Parameters, $N_x$, and velocity, V, are fed into BDE adaptor 502 and used by predictor, P, to predict an airspeed, $V_P$, for an aerospace vehicle at a desired future time. Predictor, P, may be a component configured to use rules in specially programmed algorithms to generate airspeed, $V_P$, using inputs of parameters, $N_x$, and velocity, V, for state, y, of an aerospace vehicle, such as, without limitation, aerospace vehicle 100 as shown in FIG. 1.

In other words, predictor, P, may be a processor specially programmed to function as a complementary filter. As used herein, a complementary filter takes a slow signal, V, and a fast signal, Nx, and blends them into a new signal Vp. This is called complementary because it has a high-pass signal, Nx, and a low-pass signal, V, combined with one another.

On most conventional aircraft, velocity, V, comes from a different set of sensors than the high-pass signal, Nx. Velocity, V, may be derived from a combination of a several sensors. Pressure sensors may be used to deduce the aircraft's Mach number. Temperature sensors may be used to deduce an air temperature for aerospace vehicle 100, which effectively determines the speed of sound. The Mach number and the speed of sound are used to produce an estimate of a speed for the aerospace vehicle, which in flight has been plagued by inaccuracy in the transonic regime.

As a non-limiting example, control augmentation processor, K, may be utilizing 80-time steps per second. As a non-limiting example, processing and execution of a signal from input control unit 402 to actual deflection, $\delta_{act}$, may be on the order of 0.5 seconds, or 40-time steps for control augmentation processor, K.

Based upon parameters, $N_x$, and velocity, V, values received by BDE adaptor 502, rules within a specially programmed algorithms within predictor, P, may predict an airspeed, $V_P$, for the aerospace vehicle at a time, without limitation, 0.5 seconds into the future. Airspeed, $V_P$, is a prediction of a future airspeed for aerospace vehicle 100 at a time selected in the future and formed as a single scalar number. Using airspeed, $V_P$, and rules within specially programmed algorithms within disturbance estimator, E, disturbance estimator, E, produces an output of disturbance estimate $\Delta w$, which is an estimated value for disturbance signal, w, the impact of exogenous disturbance, d, on dynamic response, G, of aerospace vehicle 100.

Disturbance estimate, $\Delta w$, is then scaled by adaptive gain, $\Delta K$, following algorithms within BDE adaptor 502 to formulate BDE command, $\delta_{BDE}$, that is sent to actuator, A, as a preemptive gain that acts on pitch control element deflection control command, $\delta_{cmd}$, from control augmentation processor, K, to produce actual deflection, $\delta_{act}$, that will preemptively counter effects of exogenous disturbance, d, on dynamic response, G, and state, y, of aerospace vehicle 100.

Thus, adaptive gain, $\Delta K$, produced by BDE adaptor 502 produces the innovative technical solution of forming BDE command, $\delta_{BDE}$. BDE command, $\delta_{BDE}$, produces the technical benefit of preempting an undesired state of the aerospace vehicle. In other words, BDE adaptor 502 formulates and uses an accurate prediction of a future airspeed for an aerospace vehicle, and based upon that accurate prediction of a future airspeed, avoids source error influences on control laws in existing control augmentation systems to derive a dynamic adaptive gain that can be patched onto a command from an existing control augmentation system to actuator, A, that preempts undesired parameters for state, y, for aerospace vehicle 100 caused by, without limitation, an exogenous aerodynamic disturbances to pitch of aerospace vehicle 100. The exogenous aerodynamic disturbances to pitch of aerospace vehicle 100 may be induced by effects of aerospace vehicle 100 transiting through a region of transonic Mach. At least because BDE adaptor 502 only needs inputs for velocity, V, parameters, $N_x$, and acceleration, $N_z$.

Predictor, P, of BDE adaptor 502 illustrated in FIG. 5, providing a scalar airspeed prediction, $V_P$, enables a feedforward control system that preempts errors in pitch control element deflection control command, $\delta_{cmd}$, from control augmentation processor, K, based upon equations of motion for the aerospace vehicle using air data measurements of the airspeed in a closed feedback loop, such as shown, without limitation, by FIG. 4. Hence, while a baseline pitch control element deflection control command, $\delta_{cmd}$, may be driven by, among other inputs, speed estimates from an air data computer input to control augmentation system, K, disturbance rejection controls driving adaptive gain, $\Delta K$, formulating BDE command, $\delta_{BDE}$, from BDE adaptor 502 are fed by a prediction for airspeed, $V_P$, generated in predictor, P.

Ideally, adaptive gain, $\Delta K$, would be applied to actual disturbance, d, or signal thereof, disturbance signal, w, shown in FIG. 4, however, precise advanced knowledge of a coming aerodynamic disturbance and its precise signal is not available, and so it is desirable to formulate BDE command, $\delta_{BDE}$, using adaptive gain, $\Delta K$, in a manner that: stabilizes the aircraft, and evolves in time—especially if an initial aerodynamic database in control augmentation system, K, proves to be incomplete or less than accurate for current conditions of an aerospace vehicle.

The arrow through adaptive gain, $\Delta K$, as shown in FIG. 5, indicates that adaptive gain, $\Delta K$, may be a time-varying gain. Further, BDE adaptor 502 may include an additional novel component, learning control, L, that modulates, refines, and adjusts adaptive gain, $\Delta K$, over time based upon actual performance and time history of dynamic response, G, of aerospace vehicle 100 and inputs of disturbance estimate, $\Delta w$, from disturbance estimator, E, and error, e, from comparator, C. For the portion for pitch control in a control augmentation system with BDE adaptor 502 attached, as shown by FIG. 5, the error, e, from comparator, C, fed to learning control, L, is the error for normal load Nz, $e_{Nz}$.

In other words, learning control, L, modulates over time adaptive gain, $\Delta K$, applied to disturbance estimate, $\Delta w$, to formulate BDE command $\delta_{BDE}$ sent to actuator, A. By assuming that errors in the estimation of the aerodynamic disturbances will be small, a learning rate, $\Gamma$, applied to adaptive gain, $\Delta K$, can be represented based upon an algorithm utilizing the expression:

$$\Delta K = -\Gamma e_y^T F B \Delta w \qquad [2]$$

where: $\Gamma$ represents a learning rate for adaptive gain, $\Delta K$, $e_y$ represents an error in the state of the aerospace vehicle, T represents a matrix transpose operation, B represents a control matrix, F represents a matrix influenced by a state feedback matrix, and $\Delta w$ represents an estimate of disturbance signal, w, representing exogenous aerodynamic disturbance, d. While different inputs may be used by BDE adaptor 502 for BDE commands to preempt effects of exogenous dynamic disturbances on axis other than pitch, in FIG. 5, a portion of BDE adaptor 502 for pitch control is illustrated.

In other words, BDE adapter 502 is configured with a processor that contains a specially programmed code that contains a numerical analysis tool that includes direct nonlinear multi-degree-of-freedom analysis rules, in lieu of a trajectory optimization tool, that leverages knowledge of an aerodynamic database and eliminates a duplication requirement for aerodynamic models from: simulation optimization programs that derive direct trajectory optimization based upon nonlinear programs and collocation, or linear models that solve Riccati equations. Hence, a novel preemption of a disturbance to a state for an aerospace vehicle is provided within a time period that allows derivation, transmission, and execution of a BDE command, $\delta_{BDE}$, to a control element for an aerospace vehicle at least because BDE command, $\delta_{BDE}$, using only inputs of velocity, V, parameters, $N_x$, and an error value for normal load $N_z$, $e_{Nz}$, output from comparator. For control of an aerospace vehicle about an axis other than pitch, or combinations of axes, selector, s2, may send other inputs from the vector for state, y, to BDE adaptor 502, and learning control, L, may select errors other than $e_{Nz}$ for normal load, $N_z$, for use in moderating adaptive gain applied to disturbance estimate, $\Delta w$.

BDE adaptor 502 may be a processor or a network of processors physically connected to or in communication with linear feedback closed loop control augmentation system 400. BDE adaptor 502 may be housed within a same housing as or within a same processing system as linear feedback closed loop control augmentation system 400. Without limitation, integration of BDE adaptor 502 with control augmentation processor, K, may be via: a mechanical mixer or a separate processor that drives control elements such as, without limitation, flight control surfaces. In other words, BDE adaptor 502 may be embedded into the aircraft as a separate subsystem that interfaces with the control systems and may or may not directly integrate through the baseline flight control system, or other avionics such as without limitation, an advanced display core processor.

Alternatively, BDE adaptor 502 could theoretically drive a surface that is not normally used for pitch control in a fly-by wire system, such as without limitation, the flaps. Hence, not shown in FIG. 5, BDE adaptor 502 could be added to aerospace vehicle 100 distinct from a base-line control system and compute and command inputs to existing or additional controls that operate as a pitch control element separate from a pre-existing control augmentation system on aerospace vehicle 100. In that way, BDE adaptor 502 operates not as an adaptor attached to control augmentation system processor, K, but rather as an added on stand-alone system that adapts the entire flight control system of aerospace vehicle 100 to predict and preempt aerodynamic disturbances to desired states for aerospace vehicle 100.

Figure 6:
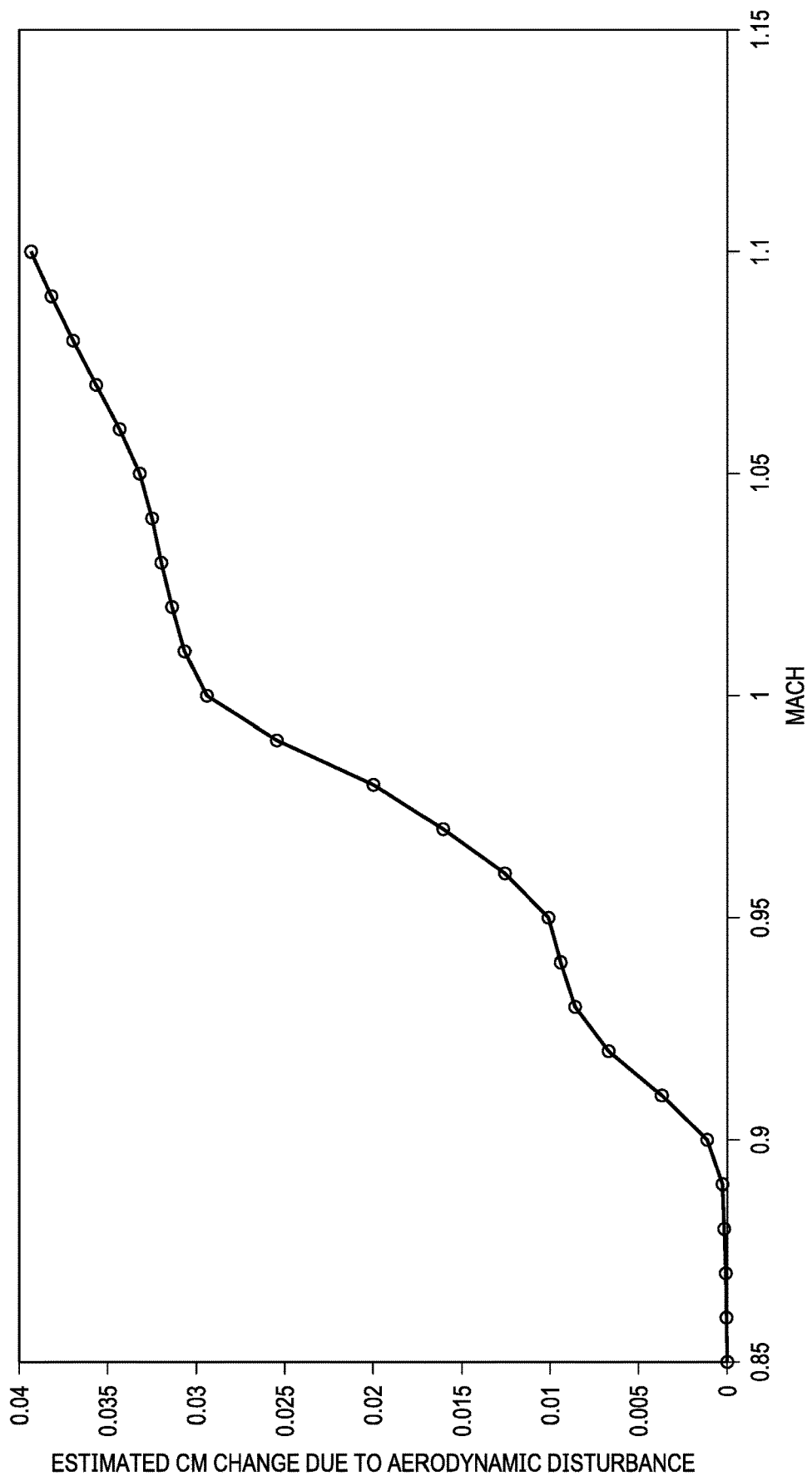
FIG. 6 is an illustration of a chart that represents an example Mach based disturbance estimate to pitching moment coefficient for an example aerospace vehicle in accordance with an illustrative example.

FIG. 6 is an illustration of a chart that represents an example Mach-based disturbance estimate to pitching moment coefficient for an example aerospace vehicle depicted in accordance with an illustrative example. In other words, for a given Mach value shown on the horizontal axis, the vertical axis of the chart estimates an effective change to the pitching moment coefficient of the aircraft caused by an aerodynamic disturbance effect of the given Mach. More specifically, FIG. 6 may visualize a representation of a portion of adaptive gain rules within disturbance estimator, E, of FIG. 5. The values along the vertical axis indicate an estimated value of change in the pitching moment coefficient for the example aerospace vehicle. For the example aerospace vehicle represented in FIG. 6, as a non-limiting example, if airspeed were Mach 0.95, but $V_P$ in 0.5 seconds is predicted to be Mach 1.0, the chart indicates that the pitching moment coefficient, CM, for the example aerospace vehicle is estimated to shift by 0.03 in 0.5 seconds. Thus, to maintain a constant 1 "g" normal load at a constant altitude with a neutral, unchanged, control input, a pitch control element shift of 2 degrees is required. Thus, the disturbance estimate, $\Delta w$, from disturbance estimator, E, will form BDE command, $\delta_{BDE}$, that will adapt pitch control element deflection control command, $\delta_{cmd}$, by 2 degrees and result in actual deflection, $\delta_{act}$, in 0.5 seconds that preempts the CM shift disturbance to the aerospace vehicle caused by the accelerating Mach. Even if control augmentation system processor, K, accessed a perfect aerodynamic database that effectively provided a chart like FIG. 6, with perfect disturbance modeling, pitch control element deflection control command, $\delta_{cmd}$, of linear feedback closed loop control augmentation system 400 still cannot produce actual deflection, $\delta_{act}$, preemptively, at least because the source errors for the air data feedback to control augmentation system processor, K, would result in entering a perfect chart with an inaccurate current Mach. The inaccurate current Mach would result in an entry point along the Mach scale that would result in an improper gain and a pitch control element deflection control command, $\delta_{cmd}$, and actual deflection, $\delta_{act}$, that would likely be equivalent to an uncommanded input for deflection of a pitch command control element.

Thus, as a non-limiting example, for the example aerospace vehicle represented by FIG. 6, a typical 0.5 Mach instrument source error could drive pitch control element deflection control command, $\delta_{cmd}$, and actual deflection, $\delta_{act}$, outputs using CM values in error as much as 0.02. Such errors would disrupt the state, y, of the aerospace vehicle equivalent to an undesired two-degree deflection of a pitch control element. Without limitation, the pitch control may be tail-mounted stabilators.

Among other improvements over current feedback control augmentation systems, which employ an air data airspeed estimate derived from air data fed into continuous time designs that approximate future airspeeds discretely with a bilinear transformation in an attempt to provide rejection control for an anticipated disturbance, the BDE adaptor uses new rules to predict an airspeed correctly into the future without using air data inputs. In contrast to systems and methods applied in a current digital augmentation control system, the BDE adaptor algorithm predicts an airspeed for the aerospace vehicle correctly into the future using either wind axes or body axes equations of motion using numerical integrations that use a bilinear transformation or a trapezoidal method of integration.

Modeling of the BDE adaptor shows a capability to predict an airspeed for the aerospace vehicle far enough into the future to allow for development of, delivery to, and execution of a disturbance rejection command for a control element of the aerospace vehicle, such that the execution of the command preempts an undesired change, caused by an exogenous aerodynamic disturbance, in a state of the aerospace vehicle. In a non-limiting example, for a Mach generated pitch disturbance, the BDE adaptor may correctly predict an airspeed of the aerospace vehicle at least 0.5 seconds into the future. Thus, at least because BDE adaptor 502 only needs inputs for velocity V, parameters, $N_X$, and $\Delta N_Z$, BDE adaptor 502 may determine disturbance estimate, $\Delta w$, and BDE command, $\delta_{BDE}$, and send BDE command, $\delta_{BDE}$, to actuator, A, and move a control element within a time period that preempts undesired exogenous aerodynamic disturbance, d, effect on dynamic response, G, of aerospace vehicle 100 from creating parameters for state, y, of aerospace vehicle 100 that are undesired from those desired initially by inputs from input control unit 402.

Hence, the BDE adaptor overcomes technological difficulties of aerodynamic disturbance prediction and rejection errors influenced by uncertain actual Mach modeled from air data that suffers from instrument source errors and/or inaccurate corrections thereto. The BDE adaptor incorporates an algorithm that includes rules that augment air data speed measurements with values of: acceleration along axis $X_B$ 110 or axis $X_W$ 122; roll angle, $\phi$; pitch angle, $\theta$; angle of attack, $\alpha$; and/or pitch rate, q, for the aerospace vehicle to generate a scalar Vdot estimate used in predicting an accurate future speed of the aerospace vehicle. Thus, the BDE adaptor overcomes as well, technological difficulties driven by errors in air data measurements for a current airspeed.

Further, instead of trying to attempt to directly implement equations, selecting an adaptive gain that holds constant the energy of errors or dissipates the power of errors in disturbance dynamics and state dynamics, the BDE adaptor derives a novel adaptive gain that estimates an exogenous aerodynamic disturbance that drives pitch control element deflection control command, $\delta_{cmd}$.

Thus, the BDE adaptor provides the innovative technical solution to prevent an undesired state for an aerospace vehicle through a combination of a novel prediction of speed, for the aerospace vehicle, that enables a novel best disturbance estimate that enables a novel adaptive disturbance effectiveness in an adaptor that can be attached to an existing control augmentation system. Thus, the BDE adaptor provides an algorithm that learns to estimate an exogenous aerodynamic disturbance to a state of the aerospace vehicle that is more accurate than estimates used by a control augmentation system in current aerospace vehicles.

The exogenous aerodynamic disturbance may be anticipated and/or experienced in particular portions of an operating envelope for the aerospace vehicle. BDE adaptor 502 may then feed the estimate as an adaptive gain into a control augmentation system to produce a command from the control augmentation system that effectively predicts and preempts an undesired state for the aerospace vehicle. The prediction and preemption are enabled by BDE adaptor 502 without requiring additional test flights to expand an aerodynamic database available to the control augmentation system. The prediction and preemption are enabled by the BDE adaptor without requiring full control law reprogramming within the existing control augmentation system. As a result, commands from control augmentation system processor, K, to actuator, A, are modified by adaptive gain, $\Delta K$, from BDE adaptor 502.

Benefits of BDE adaptor 502 have been validated in design tests in advanced flight simulators that include flight of an aerospace vehicle accelerating and decelerating through transonic Mach under a 1 "g" normal load with neutral flight control inputs to an input control unit. Hence, FIGS. 1-6 above describe at least a system, that includes: a control element of an aerospace vehicle; and a flight control system coupled to the at least one control element, such that the flight control system includes: sensors configured to measure at least an airspeed of the aerospace vehicle; and an adaptor that includes a processor that including code specially programmed to: replace a signal, from a sensor of the sensors on the aerospace vehicle input to a control augmentation system, with a predicted airspeed; estimate, based upon the predicted airspeed, an onset and characteristics of an undesired state of the aerospace vehicle; derive, based upon an estimation of the onset and the characteristics of the undesired state, a command prior to the onset of the undesired state for preempting the onset of the undesired state; issue the command to the control element of the aerospace vehicle to preempt the undesired state; and relax, based upon a preemption by the adaptor of the onset of the undesired state, a constraint imposed on a control law for the aerospace vehicle. The system may further include the adaptor configured to reduce, compared to a control augmentation system that lacks the adaptor, an amount of flight test required of the aerospace vehicle to produce aerodynamic data required for the control augmentation system to avoid an undesired aerodynamic state of the aerospace vehicle during flight of the aerospace vehicle. The system may also include the adaptor configured with a numerical analysis tool that comprises direct nonlinear multi-degree-of-freedom analysis rules, in lieu of a trajectory optimization tool, that leverages knowledge of an aerodynamic database and eliminates a duplication requirement for aerodynamic models from: simulation optimization programs that derive direct trajectory optimization based upon nonlinear programs and collocation, or linear models that solve Riccati equations.

The adaptor in the system may also be configured to: derive the command, based upon an estimate of a Mach dependent aerodynamic disturbance, that preempts the undesired state of the aerospace vehicle; and reduce a requirement to update an aerodynamic model in the control augmentation system. The control augmentation system may include a digital control system.

Still another example above shows a machine configured to enhance flight characteristics for an aerospace vehicle, the machine being a BDE (Bhan-Donahue-Endres) adaptor that comprises a specially programmed processor that includes rules to: modify a control augmentation system on the aerospace vehicle, to preclude an undesired state of the aerospace vehicle unpredicted by aerodynamic data forming a control law for the control augmentation system; form a prediction for an airspeed of the aerospace vehicle that replaces an airspeed input from a sensor of the aerospace vehicle, in a phase of operation prone to instrumentation error, into the control augmentation system; generate an estimate, based upon the prediction, of an anticipated disturbance to a desired state of the aerospace vehicle; and generate, based upon the estimate, a command to a control element of the aerospace vehicle that preempts the undesired state of the aerospace vehicle. The control augmentation system may include a digital control system. The undesired state may include a pitch disturbance. The aerospace vehicle of the example may be configured for transonic flight. The machine may also include the BDE adaptor configured to relax, based upon a preemption by the BDE adaptor of an onset of the undesired state, a constraint imposed on the control law for the aerospace vehicle. The illustrations of FIGS. 1-6 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 7:
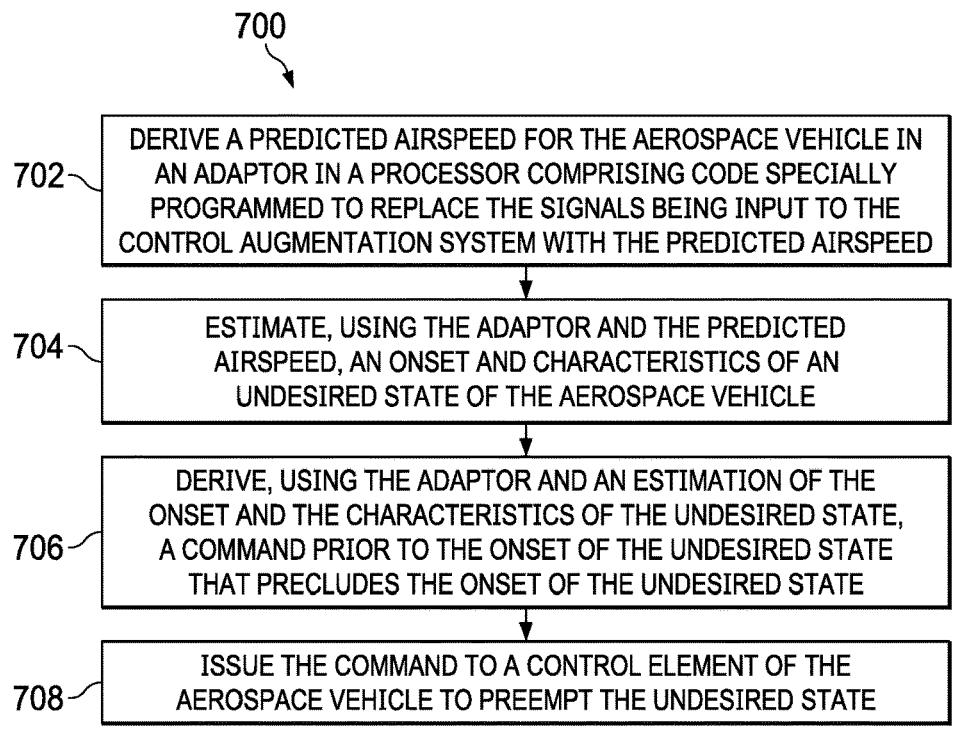
FIG. 7 is an illustration of a flowchart of a process for correcting for errors in signals, from sensors on an aerospace vehicle, being input to a control augmentation system for the aerospace vehicle in accordance with an illustrative example.

With reference now to FIG. 7, an illustration of a flowchart of a process for correcting errors in signals, from sensors on an aerospace vehicle, being input to a control augmentation system for the aerospace vehicle, is depicted in accordance with an illustrative example. More specifically, process 700 includes correcting for errors in signals, from sensors on an aerospace vehicle, being input to a control augmentation system for the aerospace vehicle via steps including: deriving a predicted airspeed for the aerospace vehicle in an adaptor in a processor comprising code specially programmed for replacing the signals being input to the control augmentation system with the predicted airspeed (operation 702). The aerospace vehicle may be an aircraft. The aerospace vehicle may be configured for transonic flight. The aerospace vehicle may include a control augmentation system.

Subsequently, process 700 may include, estimating, using the adaptor and the predicted airspeed, an onset and characteristics of an undesired state of the aerospace vehicle (operation 704). The predicted airspeed may be derived by a length of time preceding a time predicted, for an occurrence of the predicted airspeed, that is greater than a time period required for generating and executing the command. Without limitation, the length of time may be at least 0.5 seconds.

Subsequently, process 700 may include, deriving, using the adaptor and an estimation of the onset and the characteristics of the undesired state, a command prior to the onset of the undesired state and precluding the onset of the undesired state (operation 706). The undesired state may include transonic pitch disturbances to the aerospace vehicle.

Process 700 may include issuing the command to a control element of the aerospace vehicle to preempt the undesired state (operation 708). Collectively, the process may include the technical improvement of expanding an operating envelope allowed by the control augmentation system for the aerospace vehicle. The process may also include the technical improvement of expanding a flight performance envelope for the aerospace vehicle via relaxing constraints on a control law for the aerospace vehicle.

Figure 8:
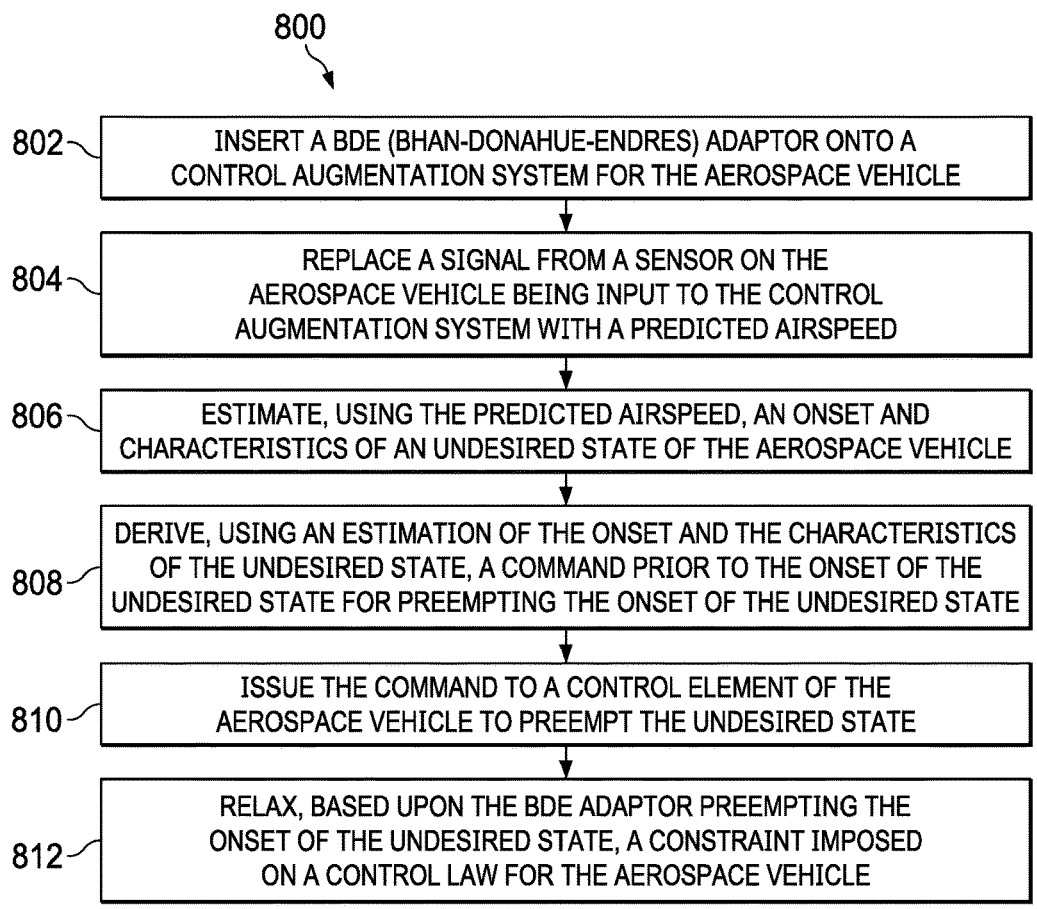
FIG. 8 is an illustration of a flowchart of a process for expanding an operating envelope for an aerospace vehicle in accordance with an illustrative example.

With reference now to FIG. 8, an illustration of a flowchart of a process for expanding an operating envelope for an aerospace vehicle is depicted in accordance with an illustrative example. More specifically, process 800 includes inserting a BDE (Bhan-Donahue-Endres) adaptor onto a control augmentation system for the aerospace vehicle (operation 802). The BDE adaptor being specially programmed with code configured to execute operations 804-812. Using the BDE adaptor, process 800 thereby includes replacing a signal from a sensor on the aerospace vehicle being input to the control augmentation system with a predicted airspeed (operation 804). Subsequently, process 800 includes estimating, using the predicted airspeed, an onset and characteristics of an undesired state of the aerospace vehicle (operation 806). Subsequently, process 800 includes deriving, using an estimation of the onset and the characteristics of the undesired state, a command prior to the onset of the undesired state for preempting the onset of the undesired state (operation 808). Deriving a command prior to the onset of the undesired state for preempting the onset of the undesired state may include the BDE adaptor applying a complementary filter to simplify a filtering model and to eliminate propagating dynamics of states, other than airspeed of the aerospace vehicle, forward in time as the control law generates a command for a control element of the aerospace vehicle.

Subsequently, process 800 includes issuing the command to a control element of the aerospace vehicle to preempt the undesired state (operation 810). Collectively, process 800 may include the technical improvement of relaxing, based upon the BDE adaptor preempting the onset of the undesired state, a constraint imposed on a control law for the aerospace vehicle.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In the illustrative examples, the hardware for the processor units may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices that may be used for processor units include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
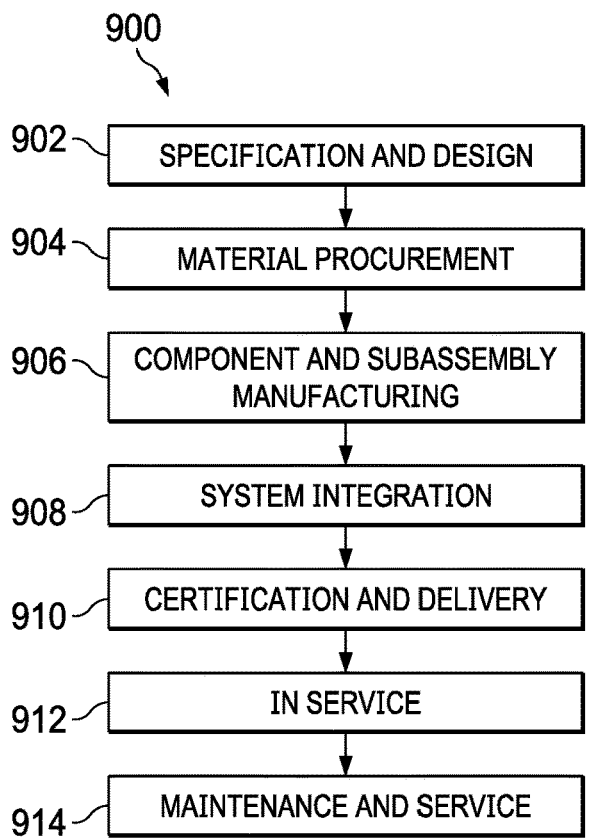
FIG. 9 is an illustration of a block diagram of an aircraft manufacturing and service method in accordance with an illustrative example.
Figure 10:
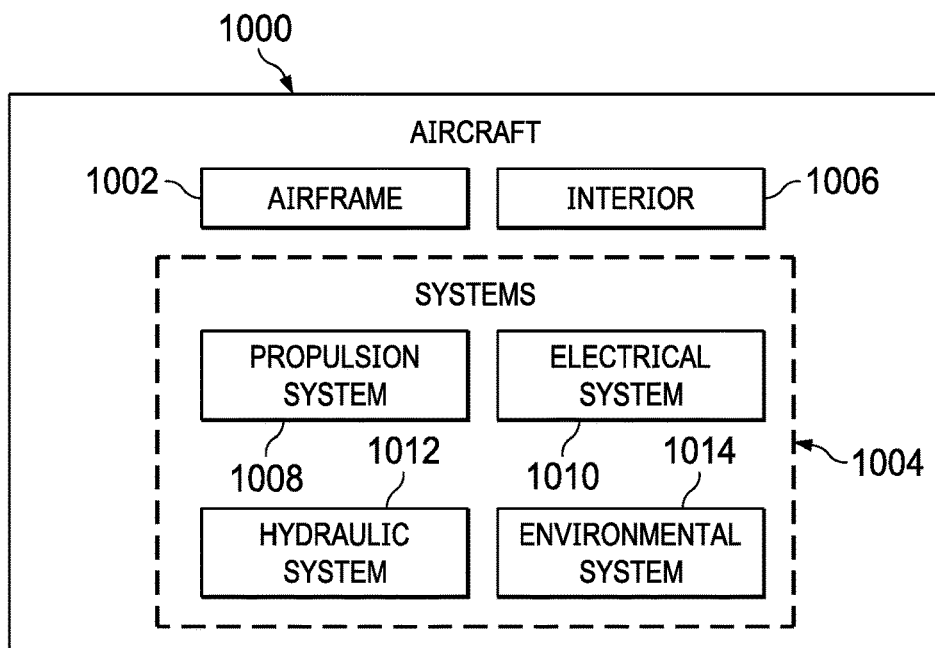
FIG. 10 is an illustration of a block diagram of an aircraft in accordance with an illustrative example.

The illustrative examples of the disclosure may be described in the context of aerospace vehicle manufacturing and service method 900 as shown in FIG. 9 and aerospace vehicle 1000 as shown in FIG. 10. Aerospace vehicle 1000 is representative of aerospace vehicle 100 of FIG. 1. Without limitation, aerospace vehicle 1000 may be an aircraft. Without limitation, aerospace vehicle 1000 may be an F-15 aircraft.

Turning first to FIG. 9, an illustration of a block diagram of an aerospace vehicle manufacturing and service method is depicted in accordance with an illustrative example. During pre-production, aerospace vehicle manufacturing and service method 900 may include specification and design 902 of aerospace vehicle 1000 in FIG. 10 and material procurement 904.

During production, component and subassembly manufacturing 906 and system integration 908 of aerospace vehicle 1000 in FIG. 10 takes place. Thereafter, aerospace vehicle 1000 in FIG. 10 may go through certification and delivery 910 in order to be placed in service 912. While in service 912 by a customer, aerospace vehicle 1000 in FIG. 10 is scheduled for routine maintenance and service 914, which may include modification, reconfiguration, refurbishment, and other maintenance or service.

Each of the processes of aerospace vehicle manufacturing and service method 900 may be performed or carried out by a system integrator, a third party, an operator, or some combination thereof. In these examples, the operator may be a customer. For the purposes of this description, a system integrator may include, without limitation, any number of aerospace vehicle manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aerospace vehicle is depicted in which an illustrative example may be implemented. In this example, aerospace vehicle 1000 is produced by aerospace vehicle manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1010. Any number of other systems may be included. Although an aerospace example is shown, different illustrative examples may be applied to other industries, such as the automotive industry.

The apparatuses and methods embodied herein may be employed during at least one of the stages of aerospace vehicle manufacturing and service method 900 in FIG. 9. One or more apparatus examples, method examples, or a combination thereof may be utilized during production stages, such as component and subassembly manufacturing 906 and system integration 908 in FIG. 9. One or more apparatus examples, method examples, or a combination thereof may be utilized while aerospace vehicle 1000 is in service 912, during maintenance and service 910 in FIG. 9, or both. The use of a number of the different illustrative examples may substantially expedite the assembly of aerospace vehicle 1000, reduce the cost of aerospace vehicle 1000, or both expedite the assembly of aerospace vehicle 1000 and reduce the cost of aerospace vehicle 1000.

Figure 11A:
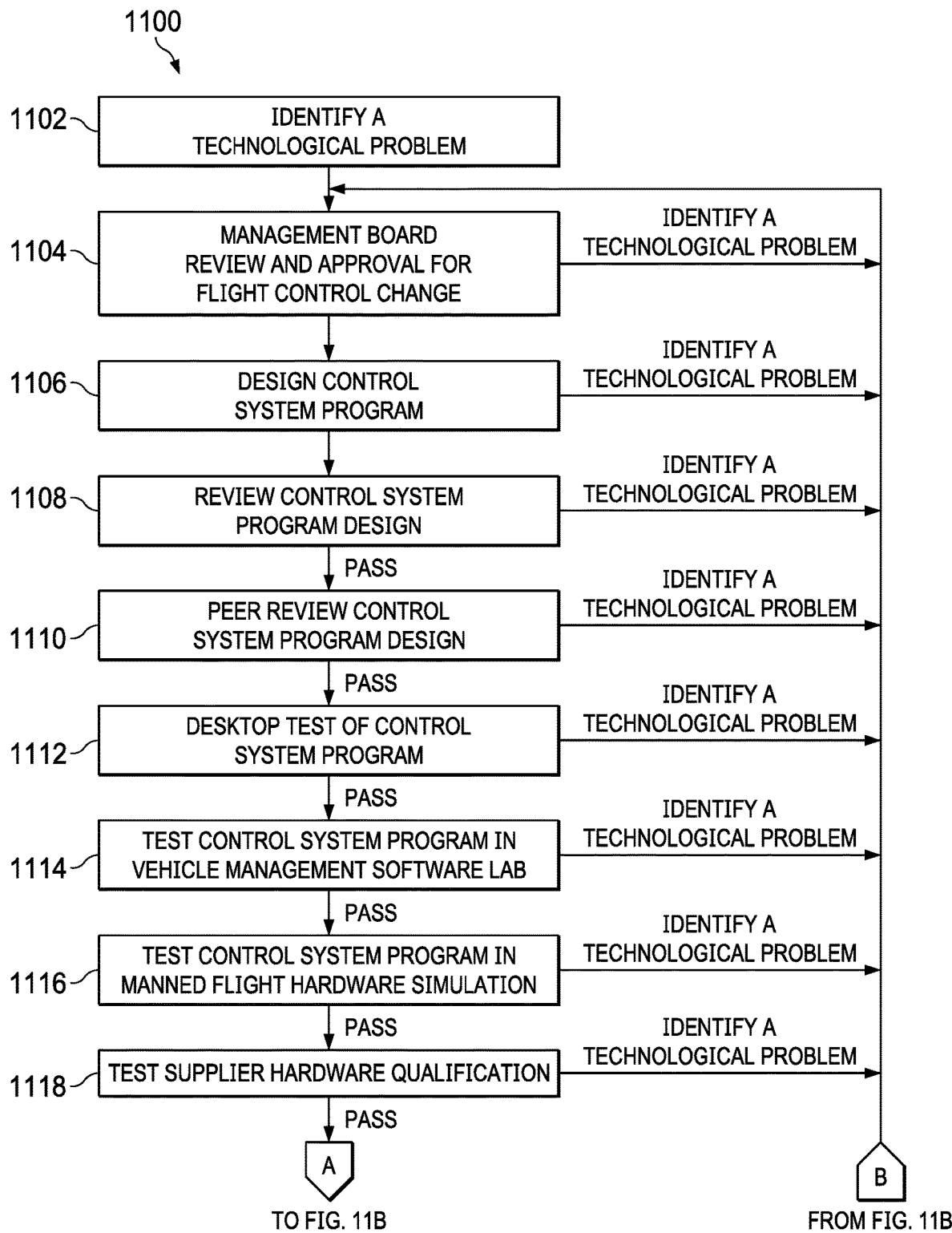
FIGS. 11A-11B are an illustration of a flowchart of a process for designing a control program for an aerospace vehicle in accordance with an illustrative example.
Figure 11B:
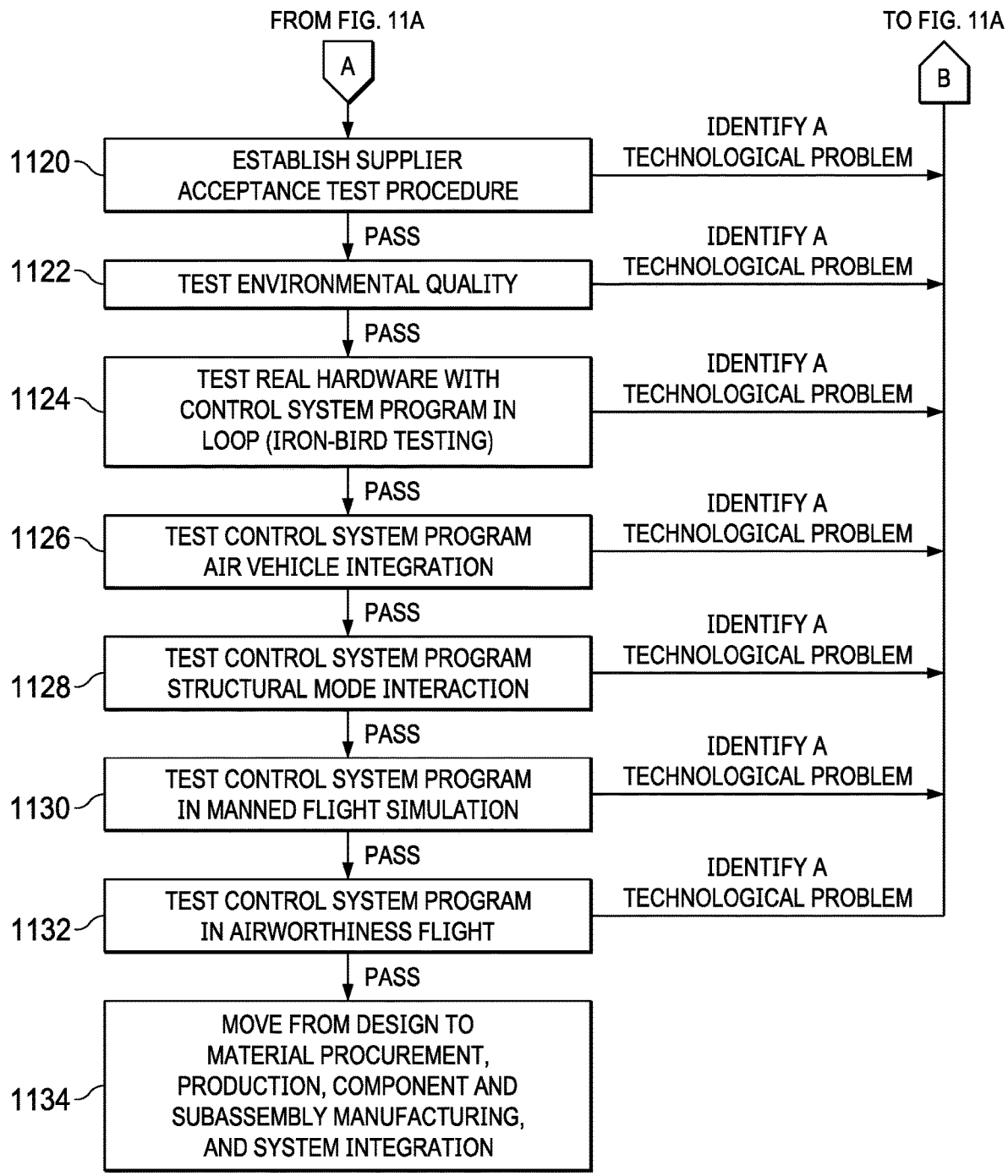

The FIG. 9 step of specification and design 902 may include process 1100 for designing a control program as illustrated by FIGS. 11A-11B. FIGS. 11A-11B are an illustration of a flowchart of a process for designing a control program for an aerospace vehicle depicted in accordance with an illustrative example.

Process 1100 for designing a control program may begin with identifying a technological problem (operation 1102). Authorizing a design change to a flight control system requires approval from a Management Board Review (operation 1104). If the Board approves, then engineering is authorized and design of algorithms and rules forming a control program providing a technical solution for the identified technological problem may commence (operation 1106). An initial design for the control system program then undergoes engineer design review (operation 1108). Initial design review may include manual and/or automated program coding logic and bug checks.

When the design review is satisfactory, the control system program undergoes peer review and design (operation 1110). As illustrated in FIG. 11A, at this point, if a new technological problem is identified in the design, or in an area related to and/or affected by the control system program, it may generate a new sub-process that also follows the steps of FIGS. 11A-11B.

When the control system program satisfies Peer Review, desktop testing of the control system program begins (operation 1112). Desktop testing may include limited simulations of program functionalities in isolation, running test data sets, and/or integration functionalities of the program with other programs of control or other systems for the aerospace vehicle. When desktop testing is satisfactory, the control system program undergoes testing in a Vehicle Management Software lab (operation 1114). When testing in the Vehicle Management Software lab is satisfactory, testing of the control system program may begin in Manned Flight Hardware Simulation (operation 1116).

Process 1100 may also include testing for supplier hardware qualification for hardware running the control system program (operation 1118), and establishing a supplier acceptance testing procedure (operation 1120). Testing of environmental quality of the control system program and/or required hardware may also be a part of the process (operation 1122).

Process 1100 continues with testing of real hardware for and interacting with the control system program in loop—also known as iron-bird testing (operation 1124). When the iron-bird testing is satisfactory, testing may be done for control system program air vehicle integration (operation 1126).

Testing for control system program air vehicle integration may be followed by testing of control system program structural mode interaction (operation 1128). These tests include operations such as ground vibration tests or other dynamic load testing. Testing of control system program structural mode interaction may be followed by Manned Flight Simulation testing (operation 1130). This testing may evaluate ergonomic and human factor issues of an operator interaction with the control system program in a simulated operational environment.

Finally, airworthiness flight testing of the control system program may begin (operation 1132). When flight testing is satisfactory, the design for the control system program may be moved into Material Procurement, Production, Component and Subassembly Manufacturing, and System Integration, as described for FIG. 9.

As additionally noted in FIGS. 11A-11B, at any phase in process, a new technological problem may identify. Where the new technological problem is directly related to the technological problem identified in operation 1102, the process may recycle back to operation 1104. When the new technological problem identified may be considered an offshoot from the technological problem identified in operation 1102, then a new sub-process that follows the format of FIGS. 11A-11B may be started.

Figure 12:
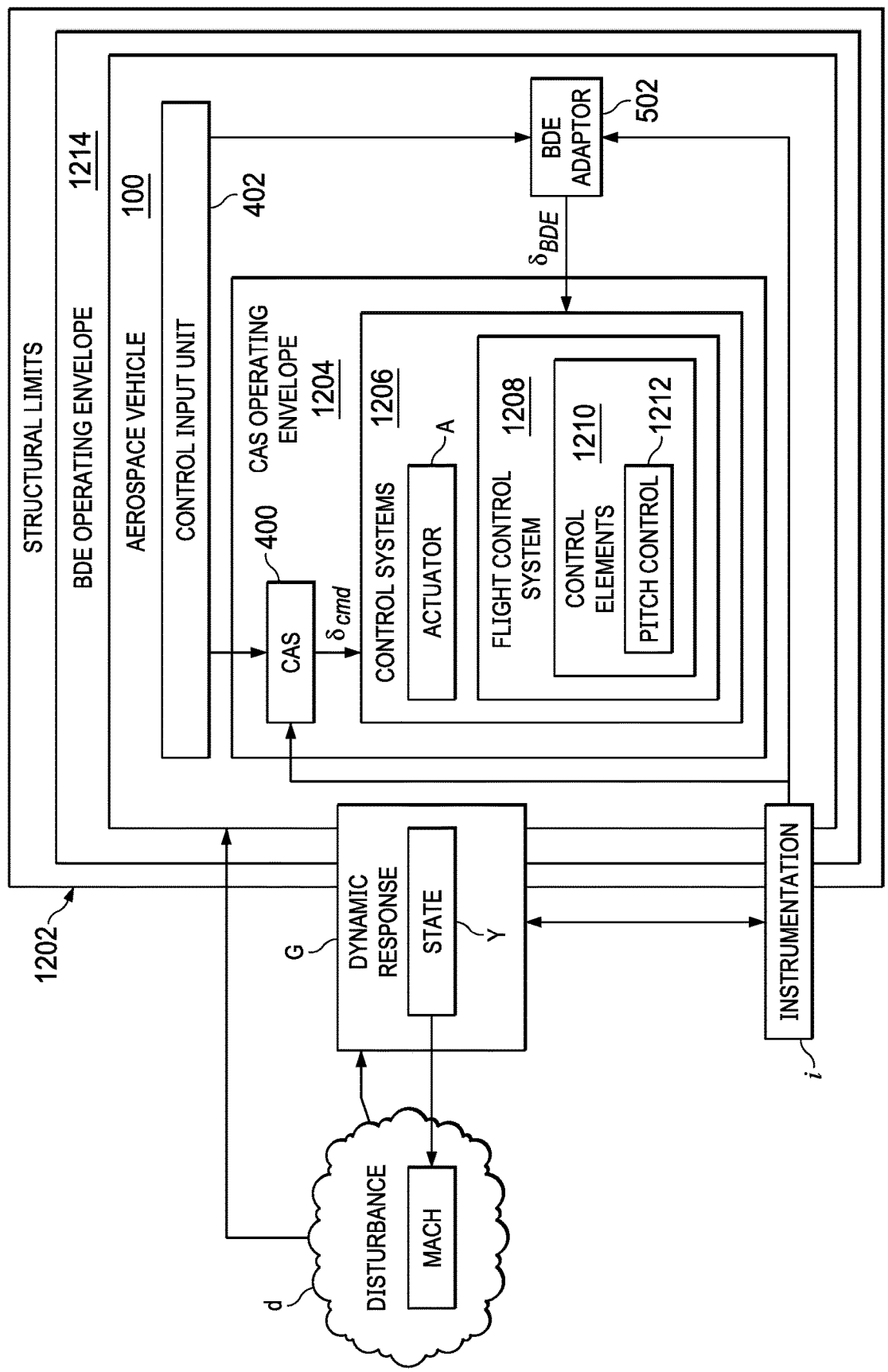
FIG. 12 is an illustration of a block diagram summary for a machine and process that estimates, predicts, and preempts an exogenous aerodynamic disturbance on an aerospace vehicle in accordance with an illustrative example.

Concluding, FIG. 12 is an illustration of a block diagram summary for a machine and process that estimates, predicts, and preempts an exogenous aerodynamic disturbance on an aerospace vehicle depicted in accordance with and illustrative example. Aerospace vehicle 100 is designed with structural limits 1202. To operate aerospace vehicle 100 without exceeding structural limits 1202, an operating envelope is defined for aerospace vehicle 100. Ideally, an operating envelope for aerospace vehicle 100 would extend fully to all edges of structural limits 1202 of aerospace vehicle 100. CAS operating envelope 1204 is shown as an operating envelope well within the edges of structural limits 1202 aerospace vehicle 100 because of technological problems with currently existing linear feedback closed loop control augmentation system 400 that cannot effectively predict and compensate for exogenous aerodynamic disturbance d to keep aerospace vehicle dynamic response within structural limits 1202 of aerospace vehicle 100 without restricting aerospace vehicle 100 to an operating envelope of a size reduced from the edges of structural limits 1202 as illustrated by CAS operating envelope 1204. BDE adaptor 502 provides the technical solution that allows for BDE operating envelope 1214 indicated as being much closer to the edges of structural limits 1202 than CAS operating envelope 1204.

Control systems 1206 are designed to control maneuvering aerospace vehicle 100 in a manner that keeps aerospace vehicle 100 performance and state, y, within parameters that define an operating envelope to keep aerospace vehicle 100 within structural limits 1202. Control input unit 402 requests performance for a desired state for aerospace vehicle 100, and sends signals therefor to control systems 1206.

Without limitation, control systems 1206 may include flight control system 1208 designed to position control elements 1210. Without limitation, flight control system 1208 may include control elements 1210 which may include pitch control element 1212. Without limitation, pitch control element 1212 may include stabilators 128 and/or elevators. Pitch control element 1212 may be a single control surface with a single or multiple actuator(s) A, or a plurality of control surfaces with a single or multiple actuator(s) A.

Flight control system 1208 may include linear feedback closed loop control augmentation system 400 configured to issue commands, such as without limitation pitch control element deflection control command, $\delta_{cmd}$, to actuator, A. Actuator, A, issues actual command, $\delta_{act}$, to move control elements 1210 which may include pitch control element 1212 based upon. As described above, without limitation, control augmentation system may be a processor or group of processors that include code that contains algorithms and rules that define control laws that respond to inputs from control input unit 402, and other inputs, and produce commands for actuator, A.

Movement of control elements 1210 result in a dynamic response, G, for aerospace vehicle 100 that establishes a state, y, of aerospace vehicle 100. State, y, may be defined by various parameters as described above. Dynamic response, G, represented by state, y, may also be affected by exogenous disturbances, which may include exogenous aerodynamic disturbance, d. As used herein, an exogenous disturbance may include affects outside of and not directly and fully controlled by flight control system 1208. Accordingly, FIG. 12 shows dynamic response, G, being potentially beyond structural limits 1202 as an indication of technological problem that BDE adaptor 502 solves. Hence, exogenous aerodynamic disturbance, d, may include without limitation, effects from Mach of aerospace vehicle 100.

Instrumentation, i, for aerospace vehicle 100 may feed values for parameters that define state, y, of aerospace vehicle back to control systems through linear feedback closed loop control augmentation system 400 and BDE adaptor 502. Instrumentation, i, may be a part of aerospace vehicle 100 and/or external to aerospace vehicle 100.

Adding novel BDE (Bhan-Donahue-Endres) adaptor 502 to aerospace vehicle 100 provides an estimate of a future exogenous aerodynamic disturbance, d, based upon a predicted future velocity of aerospace vehicle 100 and derives a command to actuator, A, that preempts undesired effect of exogenous aerodynamic disturbance, d, on state, y, desired as indicated by signals from control input unit 402. In other words, BDE adaptor 502 provides a novel algorithm that may reject an aerodynamic disturbance that will affect an aerospace vehicle. Thus, BDE adaptor 502 provides a technical solution that rejects transonic pitching disturbances. The illustrative examples describe the process for rejecting pitch disturbances due to Mach, however, one of ordinary skill in the art understands that BDE adaptor 502 may be adapted to estimate, predict, and preempt undesired states for an aerospace vehicle due to other exogenous aerodynamic disturbances. BDE adaptor 502 algorithm generates control surface commands for an aerospace vehicle based on an adaptive (learning, time-varying) estimate of an exogenous aerodynamic disturbance in order to restore performance to an inner loop control law flight control system.

The illustrative examples describe a process and machine whereby a predicted disturbance may be transmitted feed forward into a control system. A predictor may determine the magnitude and expected disturbance onset as a function of time or a state of the aerospace vehicle, like Mach. The estimate automatically adapts using a learning control based on feedbacks.

Thus, the illustrative examples show a process and machine that add a disturbance rejection property to a classically designed control augmentation system designed without a means to preempt an exogenous aerodynamic disturbance such as without limitation transonic pitch ups and pitch downs, or on an F-15 and a Bitburg roll. Hence, BDE adaptor 502 provides a novel technical solution to allow maximum performance of an aerospace vehicle within its structural limits.

Additionally, predictor, P, removes source-error from measurements that would ordinarily prevent straight forward prediction of the exogenous aerodynamic disturbance. Hence, the exogenous aerodynamic disturbance can be predicted in spite of incorrect state measurements, such as without limitation, poor Mach measurement during acceleration or deceleration of an aerospace vehicle.

Thus, the illustrative examples describe a BDE (Bhan-Donahue-Endres) adaptor that effectively preempts undesired effects of exogenous aerodynamic disturbances without a need to redesign control system existing on an aerospace vehicle and thereby allows the aerospace vehicle to operate more closely to structural limits without exceeding the structural limits of the aerospace vehicle. Hence, the BDE adaptor effectively allows for a less-conservative design for an operating envelope of the aerospace vehicle by enabling an operator to command more forces, and expands an operating envelope out to the edges of the structural limits of the aerospace vehicle.

By preempting effects from exogenous aerodynamic disturbances, the aerospace vehicle becomes less susceptible to other problems like overstresses. These technical benefits reduce an operator's workload at least because the operator does not need to anticipate, predict, and/or respond to an unexpected dynamic response of the aerospace vehicle. At least because the BDE adaptor includes a predictor, it can remove source-error from measurements dynamically. At least because the BDE adaptor has an adaptive learning control, it is not restricted to estimates of aerodynamics or the disturbance of the aerospace vehicle based upon a fixed aerodynamic database referenced by an existing control augmentation system.

Thus, the illustrative examples provide a method and apparatus for managing commands for flight control surfaces. Without limitation, one or more illustrative examples may use a control augmentation system. Without limitation, one or more illustrative examples may use a digital control augmentation system. Without limitation, one or more illustrative examples may use a digital fly-by-wire systems for the aerospace vehicle. The flight control system implemented in accordance with an illustrative example may provide input data congruency with respect to commands that are processed in a flight control system.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A process comprising:
   correcting for errors in signals, from sensors on an aerospace vehicle, being input to a control augmentation system for the aerospace vehicle, via:
      deriving a predicted airspeed for the aerospace vehicle in an adaptor comprising a processor comprising code specially programmed for replacing the signals being input to the control augmentation system with the predicted airspeed;
      estimating, using the adaptor and the predicted airspeed, an onset and characteristics of an undesired state of the aerospace vehicle;
      deriving, using the adaptor and an estimation of the onset and the characteristics of the undesired state, a command prior to the onset of the undesired state and precluding the onset of the undesired state; and
      issuing the command to a control element of the aerospace vehicle to preempt the undesired state.

2. The process of claim 1, wherein the aerospace vehicle is an aircraft comprising the control augmentation system.

3. The process of claim 1, wherein the predicted airspeed is derived by a length of time preceding a time predicted, for an occurrence of the predicted airspeed, that is greater than a time period required for generating and executing the command.

4. The process of claim 3 further comprising the length of time being at least 0.5 seconds.

5. The process of claim 1, wherein the undesired state comprises transonic pitch disturbances to the aerospace vehicle.

6. The process of claim 1 further comprising expanding an operating envelope allowed by the control augmentation system for the aerospace vehicle.

7. The process of claim 1 further comprising expanding a flight performance envelope for the aerospace vehicle via relaxing constraints on a control law for the aerospace vehicle.

8. The process of claim 1, wherein the aerospace vehicle is an aircraft configured for transonic flight.

9. A process for expanding an operating envelope for an aerospace vehicle, the process comprising:
   inserting an adaptor onto a control augmentation system for the aerospace vehicle, the adaptor comprising a processor comprising code specially programmed for:
      replacing a signal from a sensor on the aerospace vehicle being input to the control augmentation system with a predicted airspeed;
      estimating, using the predicted airspeed, an onset and characteristics of an undesired state of the aerospace vehicle;
      deriving, using an estimation of the onset and the characteristics of the undesired state, a command for preempting the onset of the undesired state prior to the onset of the undesired state;
      preempting the undesired state via issuing, the command to a control element of the aerospace vehicle; and
      relaxing, based upon the adaptor preempting the onset of the undesired state, a constraint imposed on a control law for the aerospace vehicle.

10. The process of claim 9, wherein the adaptor applies a complementary filter simplifying a filtering model and eliminating propagating dynamics of states, other than airspeed of the aerospace vehicle, forward in time as the control law generates the command for the control element of the aerospace vehicle.

11. A system, that comprises:
   a control element of an aerospace vehicle; and
   a flight control system coupled to the control element, such that the flight control system comprises:
      sensors configured to measure at least an airspeed of the aerospace vehicle; and an adaptor that comprises a processor comprising code specially programmed to:
         replace a signal, from a sensor of the sensors, input to a control augmentation system, with a predicted airspeed;
         estimate, based upon the predicted airspeed, an onset and characteristics of an undesired state of the aerospace vehicle;
         derive, based upon an estimation of the onset and the characteristics of the undesired state, a command prior to the onset of the undesired state to preempt the onset of the undesired state;
         issue the command to the control element of the aerospace vehicle to preempt the undesired state; and
         relax, based upon a preemption by the adaptor of the onset of the undesired state, a constraint imposed on a control law for the aerospace vehicle.

12. The system of claim 11, further comprising the adaptor configured to reduce, compared to a control augmentation system that lacks the adaptor, an amount of flight test required of the aerospace vehicle to produce aerodynamic data required for the control augmentation system to avoid an undesired aerodynamic state of the aerospace vehicle during flight of the aerospace vehicle.

13. The system of claim 11, further comprising the adaptor configured with a numerical analysis tool that comprises direct nonlinear multi-degree-of-freedom analysis rules, in lieu of a trajectory optimization tool, that leverages knowledge of an aerodynamic database and eliminates a duplication requirement for aerodynamic models from: simulation optimization programs that derive direct trajectory optimization based upon nonlinear programs and collocation, or linear models that solve Riccati equations.

14. The system of claim 11, further comprising the adaptor configured to:
   derive the command, based upon an estimate of a Mach dependent aerodynamic disturbance, that preempts the undesired state of the aerospace vehicle; and
   reduce a requirement to update an aerodynamic model in the control augmentation system.

15. The system of claim 11, wherein the control augmentation system comprises a digital control system.

16. A machine configured to enhance flight characteristics for an aerospace vehicle, the machine being an adaptor that comprises a specially programmed processor that comprises rules to:
   modify a control augmentation system on the aerospace vehicle, to preclude an undesired state unaccounted for by control laws in the control augmentation systems of the aerospace vehicle;
   derive a prediction for an airspeed of the aerospace vehicle;
   replace an airspeed input, from a sensor of the aerospace vehicle in a phase of operation prone to instrumentation error, into the control augmentation system with the prediction;

generate, based upon the prediction, a disturbance estimate to a desired state of the aerospace vehicle; and generate, based upon the disturbance estimate, a command to a control element of the aerospace vehicle that preempts the undesired state of the aerospace vehicle.

17. The machine of claim 16, wherein the control augmentation system comprises a digital control system.

18. The machine of claim 16, wherein the undesired state comprises a pitch disturbance.

19. The machine of claim 16, further comprising the aerospace vehicle configured for transonic flight.

20. The machine of claim 16, further comprising the adaptor configured to relax, based upon a preemption by the adaptor of an onset of the undesired state, a constraint imposed on a control law of the control laws for the aerospace vehicle.

* * * * *